(12) United States Patent
Makino

(10) Patent No.: US 7,900,339 B2
(45) Date of Patent: Mar. 8, 2011

(54) METHOD OF MAKING A MOTOR INCLUDING AN INSULATING SPACER

(75) Inventor: Yusuke Makino, Kyoto (JP)

(73) Assignee: Nidec Corporation, Kyoto (JP)

( * ) Notice: Subject to any disclaimer, the term of this patent is extended or adjusted under 35 U.S.C. 154(b) by 313 days.

(21) Appl. No.: 12/138,584

(22) Filed: Jun. 13, 2008

(65) Prior Publication Data

US 2008/0307633 A1   Dec. 18, 2008

(30) Foreign Application Priority Data

Jun. 15, 2007   (JP) ................. 2007-158485

(51) Int. Cl.
    *H02K 15/00*   (2006.01)
(52) U.S. Cl. ........... 29/596; 29/597; 29/598; 310/156.09
(58) Field of Classification Search ........... 29/596–598, 29/732–736; 310/215–218, 234, 156.09, 310/156.72; 242/433, 433.1
    See application file for complete search history.

(56) References Cited

U.S. PATENT DOCUMENTS

| | | | |
|---|---|---|---|
| 4,876,473 A * | 10/1989 | Tanaka et al. | 310/216.018 |
| 5,988,554 A * | 11/1999 | Taka | 242/433.1 |
| 6,601,288 B2 * | 8/2003 | Becherucci et al. | 29/596 |
| 6,712,307 B2 * | 3/2004 | Iwase et al. | 242/433 |
| 6,756,716 B2 | 6/2004 | Siems et al. | |

FOREIGN PATENT DOCUMENTS

| | | |
|---|---|---|
| JP | 2003-143791 A | 5/2003 |
| JP | 2004-32964 A | 1/2004 |

OTHER PUBLICATIONS

Makino; "Motor"; U.S. Appl. No. 12/138,577; filed Jun. 13, 2008.

\* cited by examiner

*Primary Examiner* — Minh Trinh

(74) *Attorney, Agent, or Firm* — Keating & Bennett, LLP

(57) ABSTRACT

In a motor, an insulator covering an armature core has a lid covering an end surface of the armature core. The lid has an inner ring disposed radially inside slots of the armature core and an outer ring disposed radially outside the slots. Each of a plurality of slot insulators inserted into the slots has a blocking portion at a position in the inner ring.

4 Claims, 50 Drawing Sheets

SECTION II-II

SECTION B-B

SECTION A-A

METHOD OF MAKING A MOTOR INCLUDING AN INSULATING SPACER

BACKGROUND OF THE INVENTION

1. Field of the Invention

The present invention relates to motors having coils through which high currents pass, more particularly, to motors having armatures using U-shaped conductors.

2. Description of the Related Art

Motors for driving heavy machines such as industrial machines gain the necessary power by passing a high current of 100 A or more through conductors. The conductors for use in a motor requiring a high current are too thick to be wound circularly around a magnetic pole of an armature core by a coil winder. The conductors are therefore bent into a U-shape by, e.g., a machine press in advance and then attached to the armature core.

Japanese Unexamined Patent Publication No. 2004-32964, for example, discloses a technique of attaching a spacer at the ends of approximately U-shaped segment conductors to align the segment conductors with a predetermined spacing in between.

Generally, when high currents are applied to conductors, a great amount of heat is generated due to the electric resistance of the conductors, which heat is accumulated excessively within the motor. The conductors to be attached to the armature therefore require a heat dissipation structure that, e.g., provides spacings between adjacent conductors.

In Japanese Unexamined Patent Publication No. 2004-32964, however, the ends of the segment conductors are positioned uniformly at a certain axial level, and thus the circumferentially adjacent segment conductors have their ends arranged close to one another. This structure disadvantageously hinders heat dissipation of the segment conductors.

Moreover, since the spacer is coupled only to the segment conductors, the insertion positions of the segment conductors determine the position of the spacer. Therefore, a jig and the like have to be used to locate the segment conductors axially, which complicates the manufacturing process of the armature.

Further, the above technique is not applicable in the case where the conductors are so thick that they need to be bent by a machine press or the like. Thus, Japanese Unexamined Patent Publication No. 2004-32964 is only suitable for armatures with conductors having a relatively small thickness, i.e., armatures to be applied with low currents, but not for armatures to be applied with high currents with conductors having a large thickness.

SUMMARY OF THE INVENTION

In order to overcome the problems described above, preferred embodiments of the present invention provide a manufacturing method of a motor having an armature arranged concentrically with a central axis of the motor including the steps of: a) arranging an insulating spacer at a first axial end of an armature core of the armature, wherein the armature includes the armature core having a plurality of teeth each extending substantially perpendicularly to the central axis and spaced evenly apart from one another in a circumferential direction, a core back having a substantially annular shape connecting the teeth, and a slot defined by an inner peripheral surface of the core back and a pair of opposing surfaces of adjacent teeth; a plurality of substantially U-shaped conductors including a pair of linear portions substantially parallel with one another and inserted into a corresponding slot; and a connecting portion covering an end surface of the armature core and connecting corresponding linear portions; wherein the insulating spacer is arranged at the first axial end of the armature core and includes a conductor supporting portion arranged to support the connecting portion; b) inserting the conductor into the slot; and c) arranging the connecting portion of the conductor at the conductor supporting portion of the insulating spacer.

Other features, elements, advantages and characteristics of the present invention will become more apparent from the following detailed description of preferred embodiments thereof with reference to the attached drawings.

BRIEF DESCRIPTION OF THE DRAWINGS

FIG. 5 is partly a cross-sectional view.

DETAILED DESCRIPTION OF PREFERRED EMBODIMENTS

Figure 1:
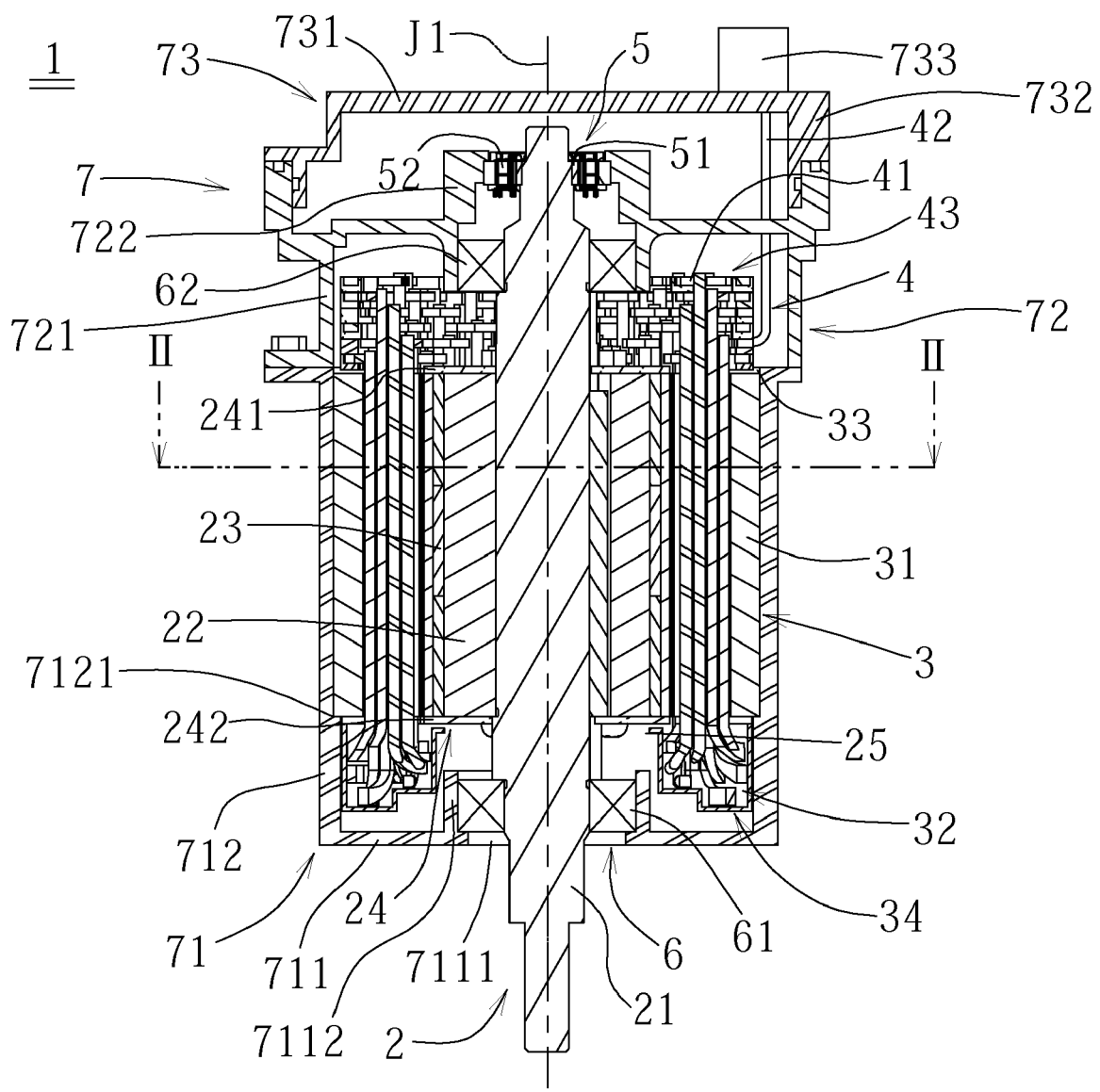
FIG. 1 is a schematic cross-sectional view of a motor according to a preferred embodiment of the present invention taken along an axial direction.

Referring to FIGS. 1 through 35, preferred embodiments of the present invention will be described in detail. It should be noted that in the explanation of the preferred embodiments of the present invention, when positional relationships among and orientations of the different components are described as being up/down or left/right, ultimately positional relationships and orientations that are in the drawings are indicated; positional relationships among and orientations of the components once having been assembled into an actual device are not indicated. Meanwhile, in the following description, an axial direction indicates a direction parallel or substantially parallel to a rotation axis, and a radial direction indicates a direction perpendicular or substantially perpendicular to the rotation axis.

Overall Structure of the Motor

Figure 2:
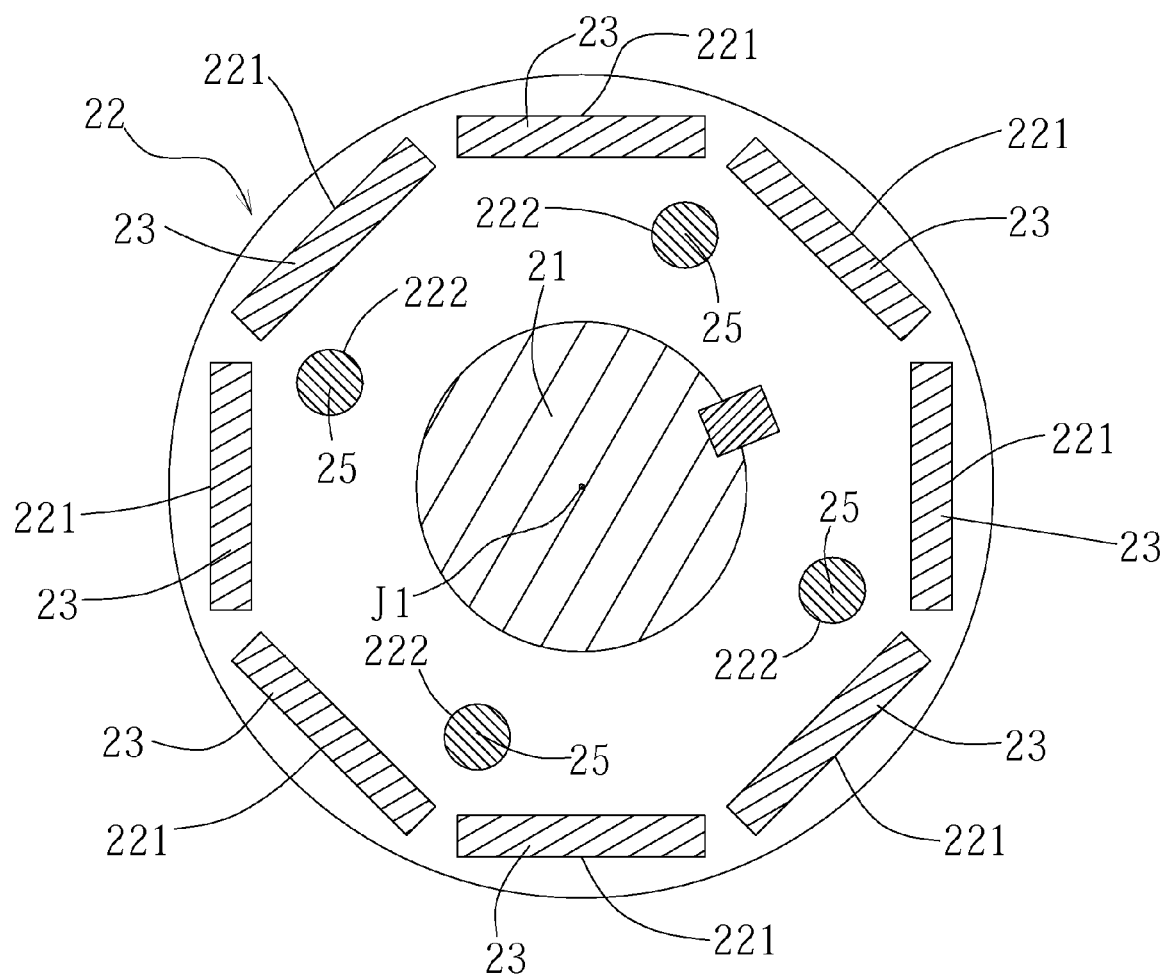
FIG. 2 is a schematic plan view of a rotor of FIG. 1 showing a cross-section taken along the line II-II and viewed in the direction of the arrow.

The overall structure of a motor according to a preferred embodiment of the present invention will be described with reference to FIGS. 1 and 2. FIG. 1 is a schematic cross-sectional view of the motor according to the present preferred embodiment taken along an axial direction. FIG. 2 is a plan view of a rotor 2 of FIG. 1 showing a cross-section taken along the II-II direction and viewed in the direction of the arrow.

Referring to FIG. 1, a motor 1 according to the present preferred embodiment includes a rotor 2, an armature 3, a connection terminal table 4, a sensor 5, bearing mechanisms 6, and a housing 7. The rotor 2 rotates about a predetermined central axis J1. The armature 3 is disposed radially outside the rotor 2. The connection terminal table 4 allows connection of conductors defining the armature 3. The sensor 5 detects positions of the rotor 2 during rotation. The bearing mechanisms 6 rotatably support the rotor 2 and are spaced apart from each other in the axial direction. The housing 7 holds the armature 3 and the bearing mechanisms 6 and isolates a portion of the rotor 2, the armature 3, the connection terminal table 4, and the sensor 5 from external air.

In the following description, the side on which the sensor 5 is disposed in the figure is referred to as the upper side, and the side on which the armature 3 is disposed is referred to as the lower side, for convenience sake; however, it should be noted that the central axis J1 is not necessarily coincident with the direction of gravitational force.

The rotor 2 includes a shaft 21, a rotor core 22, a plurality of rotor magnets 23, end plates 24, and fixing members 25. The shaft 21 is an output shaft disposed coaxially with the central axis J1. The rotor core 22 is fixed on the outer peripheral surface of the shaft 21 and is defined by a plurality of thin magnetic steel plates laminated in the axial direction. The rotor magnets 23 are contained in the rotor core 22. The end plates 24 are disposed on the upper and lower end surfaces of the rotor core 22 to keep the rotor magnets 23 from flying out. The fixing members 25 fix the end plates 24.

The rotor core 22 is provided with approximately rectangular first through holes 221 that penetrate the rotor core 22 from the upper end surface to the lower end surface to contain the rotor magnets 23. The first through holes 221 are arranged at predetermined intervals along a circumferential direction on the radially outer peripheral side of the rotor core 22 (see FIG. 2; the first through holes 221 are provided at eight positions in the present preferred embodiment). Second through holes 222 for inserting the fixing members 25 are provided radially inside the first through holes 221 at predetermined intervals along the circumferential direction (see FIG. 2; the second through holes 222 are provided at four positions in the present preferred embodiment).

A rotor magnet 23 to be contained in a through hole 221 has a rectangular or substantially rectangular shape and is preferably divided into three pieces in the axial direction. Adhesive is filled between each of the pieces of the rotor magnet 23 lined in the axial direction.

The end plates 24 include an upper end plate 241 disposed on the upper end surface of the rotor core 22 and a lower end plate 242 disposed on the lower end surface of the rotor core 22. Both the upper and lower end plates 241 and 242 are provided with through holes at positions corresponding to the second through holes 222 of the rotor core 22 (see FIG. 2).

The fixing members 25 include nuts and bolts. A bolt is inserted from the upper side of the upper end plate 241 through a second through hole 222 to protrude from the lower side of the lower end plate 242, and a nut is fixed to the protruding bottom portion of the bolt, whereby the upper and lower end plates 241 and 242 fixedly hold the rotor core 22 between them in the axial direction.

The armature 3 includes an armature core 31, a plurality of conductors 32, and an insulator 33. The armature core 31 is defined by a plurality of thin steel plates laminated in the axial direction. The conductors 32 have an approximately U-shape and are inserted into the armature core 31. The insulator 33 is interposed between the armature core 31 and the conductors 32 to prevent short circuits from occurring between the armature core 31 and the conductors 32.

The connection terminal table 4 is disposed on the upper end surface of the armature core 31. The connection terminal table 4 includes a plurality of connection terminals 41, a plurality of output terminals 42, and a terminal table 43. The connection terminals 41 are connected with the ends of the conductors 32. The output terminals 42 extend in the axial direction to be connected to an external control unit (not shown). The terminal table 43 holds the connection terminals and is made from an insulating material.

The sensor 5 is disposed axially above the armature 3. The sensor 5 of the present preferred embodiment is a resolver. The resolver has an out-of-round resolver rotor 51 and a resolver armature 52. The resolver rotor 51 is fixed to the shaft 21. The resolver armature 52 radially opposes the resolver rotor 51 with a gap therebetween. The resolver rotor 51 is formed of a plurality of thin steel plates laminated in the axial direction. The resolver armature 52 has an armature core and a coil. The armature core is formed of a plurality of thin magnetic steel plates laminated in the axial direction. The coil is defined by conductors wound around the armature core with an electrically insulating material interposed therebetween.

The bearing mechanisms 6 are disposed axially above and axially below the rotor core 22. The bearing mechanisms 6 of the present preferred embodiment are ball bearings. The bearing mechanisms 6 are fitted to the shaft 21 (the bearing mechanism 6 disposed below the rotor core 22 is referred to as a lower ball bearing 61, and the bearing mechanism 6 disposed above the rotor core 22 is referred to as an upper ball bearing 62 in the following description).

The housing 7 is preferably made from aluminum through die casting. The housing 7 includes a first bracket 71, a second bracket 72, and a third bracket 73. The first bracket 71 has a bottom 711 provided with an opening 7111 which is concentric with the central axis J1, and a cylindrical portion 712 that holds the armature core 31. The second bracket 72 is fixed at the upper edge of the first bracket 71 and holds the resolver armature 52 of the sensor 5. The third bracket 73 is fixed at the upper edge of the second bracket 72 and seals the motor 1.

Provided inside the opening 7111 in the bottom 711 of the first bracket 71 is a bearing holding portion 7112 to which the lower ball bearing 61 is fixed. The shaft 21 protrudes downward from the lower surface of the first bracket 71 through the opening 7111. The cylindrical portion 712 of the first bracket 71 is provided with a stepped portion 7121 on which the outer peripheral edge of the lower end surface of the armature core 31 is placed. With this structure, the armature 3 is located axially relative to the first bracket 71.

The second bracket 72 has a cylindrical portion 721 and a holding cylindrical portion 722. The cylindrical portion 721 is fixed on the first bracket 71. The holding cylindrical portion 722 is provided radially inside the cylindrical portion 721 to hold the resolver armature 52. The holding cylindrical portion 722 holds the upper ball bearing 62 at a position below the resolver armature 52.

The third bracket 73 has a plate-like portion 731 and a cylindrical portion 732. The plate-like portion 731 covers the cylindrical portion 721 of the second bracket 72. The cylindrical portion 732 is engaged with the cylindrical portion 721. The third bracket 73 is provided with a connector 733 at a position corresponding to the output terminals 42 of the connection terminal table 4. The output terminals 42 are fixed to the connector 733. An external power source (not shown) and the output terminals 42 are connected through the connector 733.

Structure of the Armature

Figure 3:
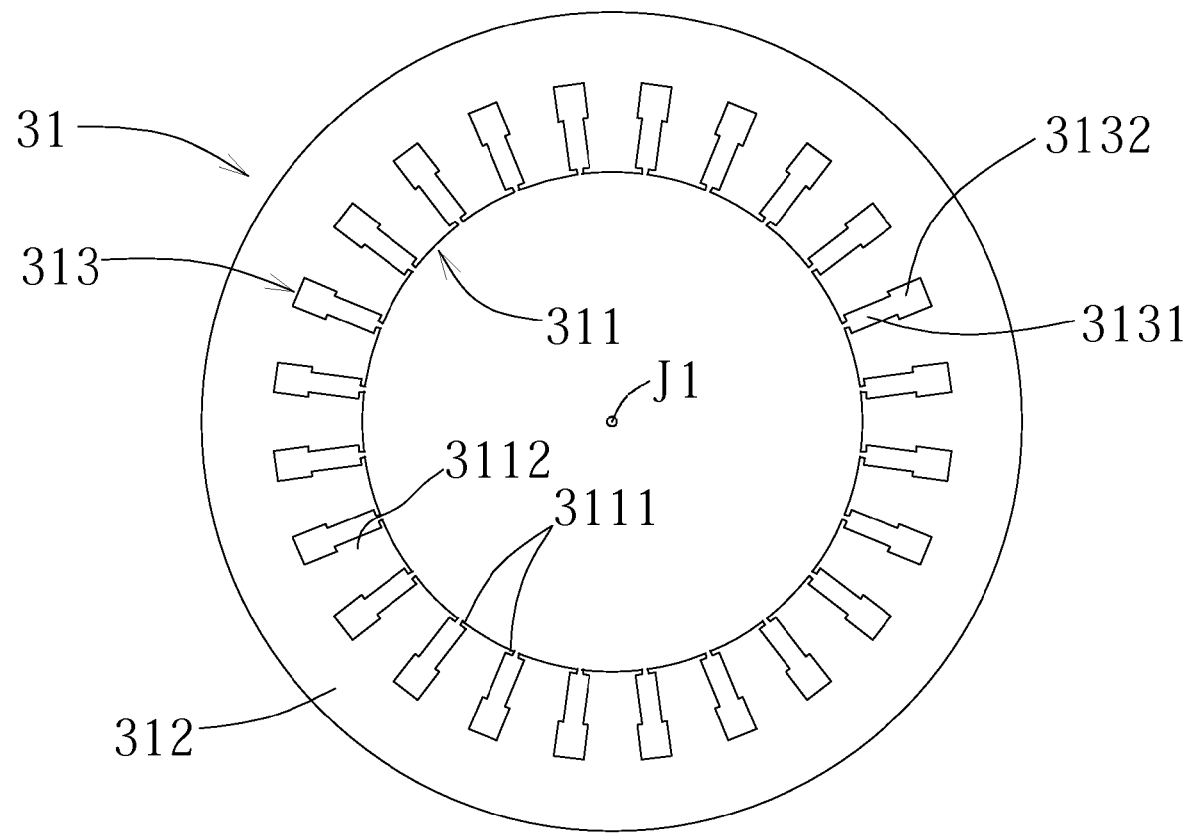
FIG. 3 is a schematic plan view of an armature core when viewed from above.
Figure 4:
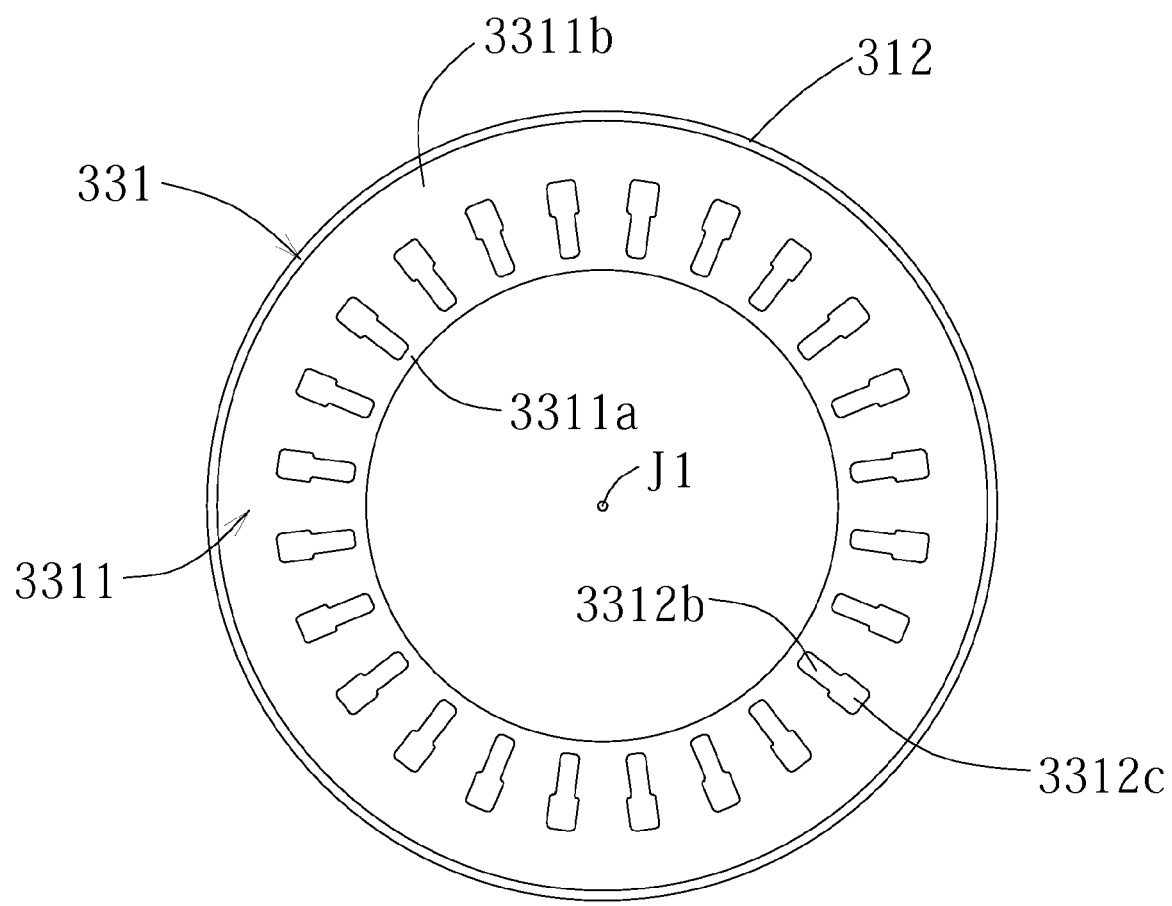
FIG. 4 is a schematic plan view of the armature core of FIG. 3 mounted with an insulator when viewed from below.
Figure 5:
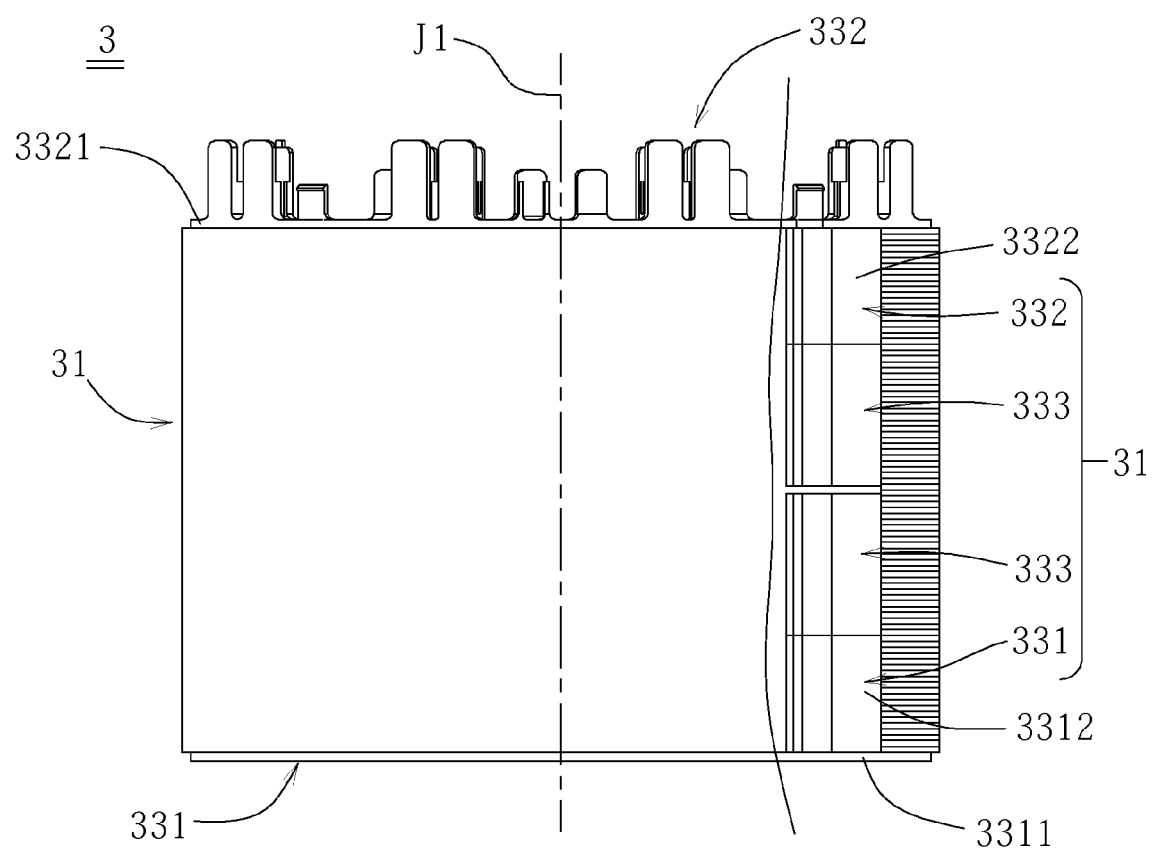
FIG. 5 is a schematic side view of the structure shown in FIG. 4. Also.
Figure 6:
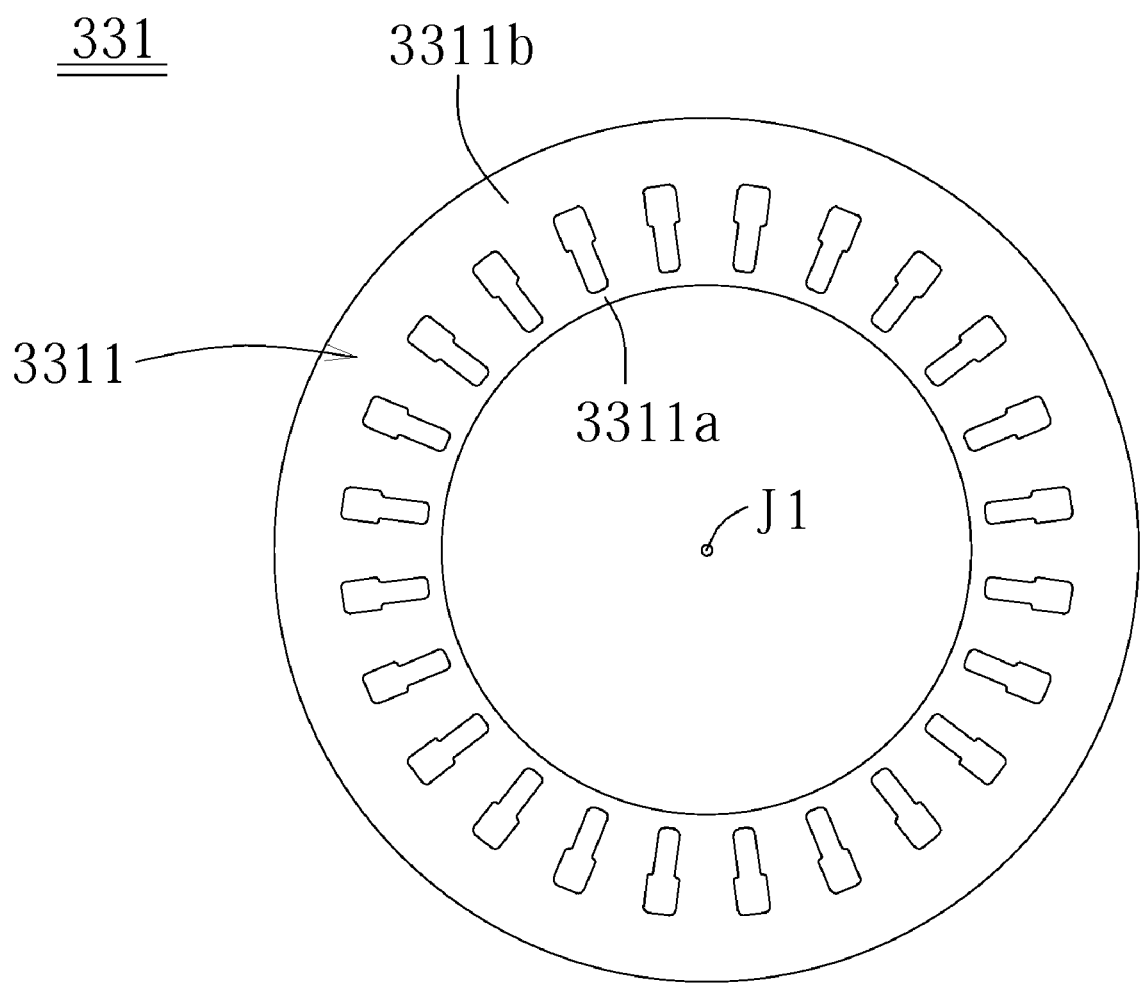
FIG. 6 is a schematic plan view of an upper insulator when viewed in the axial direction.
Figure 7:
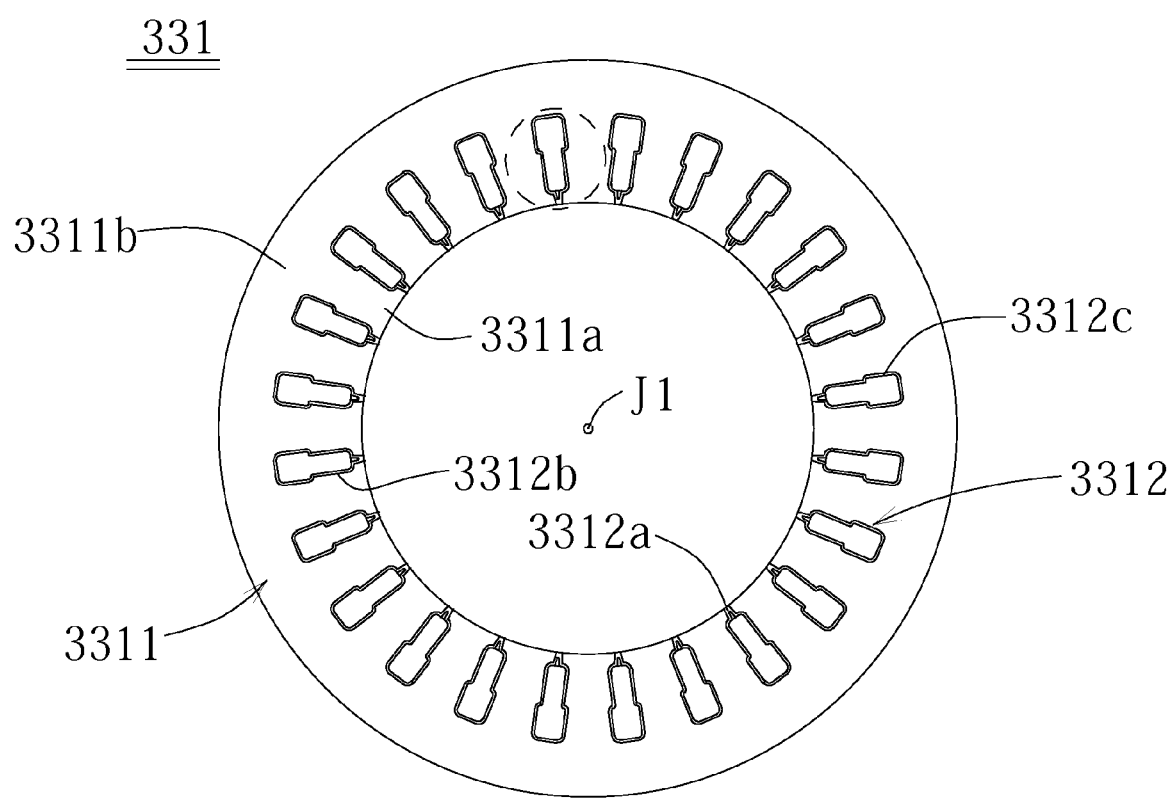
FIG. 7 is a schematic plan view of the upper insulator when viewed in the axial direction from the opposite side to FIG. 6.
Figure 8:
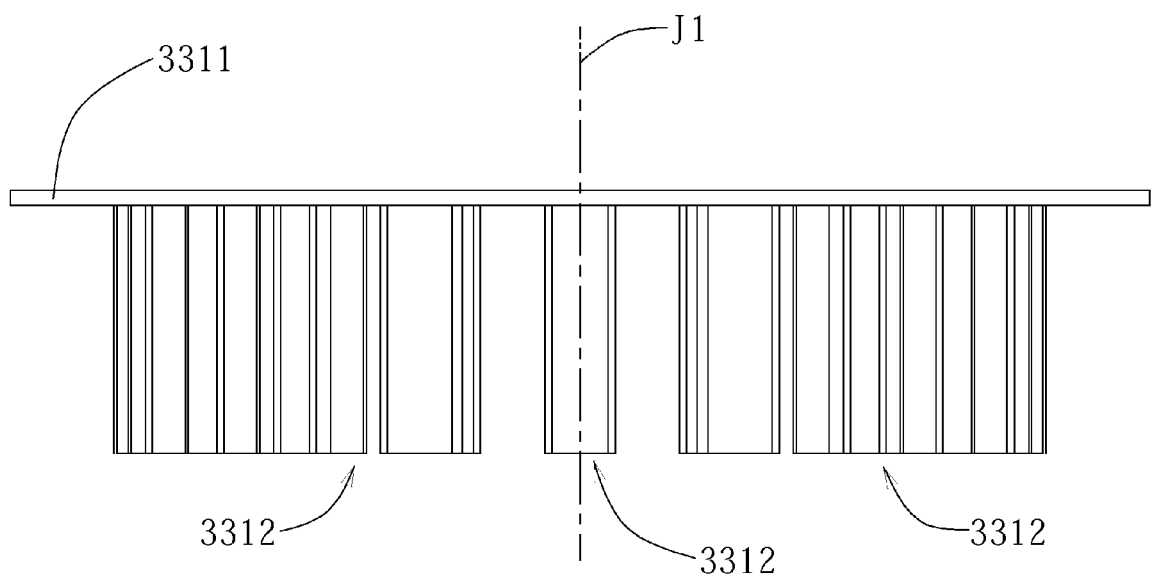
FIG. 8 is a schematic side view of the upper insulator when viewed from a side.
Figure 9A:
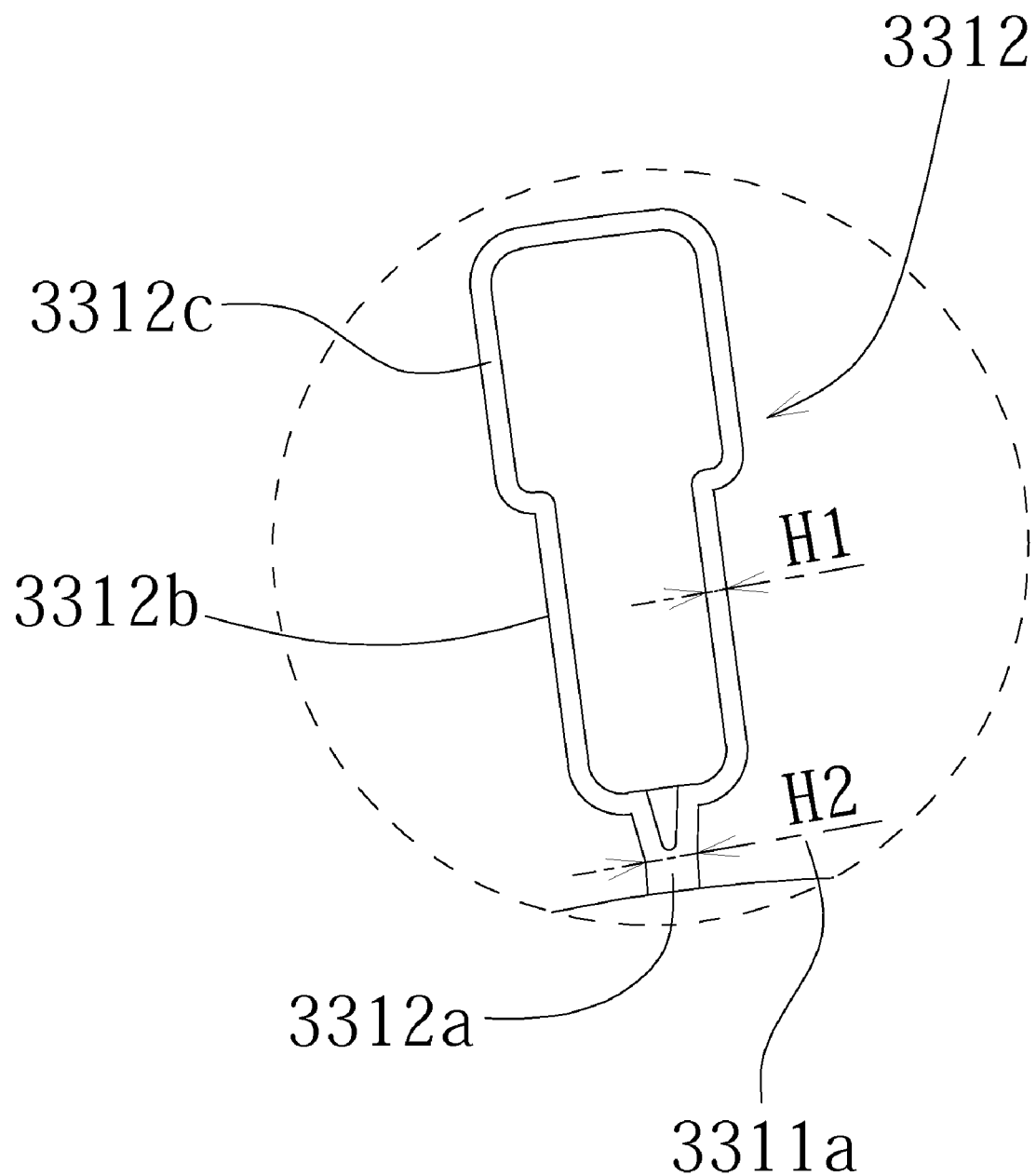
FIGS. 9A and 9B are schematic enlarged views of a portion shown in FIG. 7.
Figure 9B:
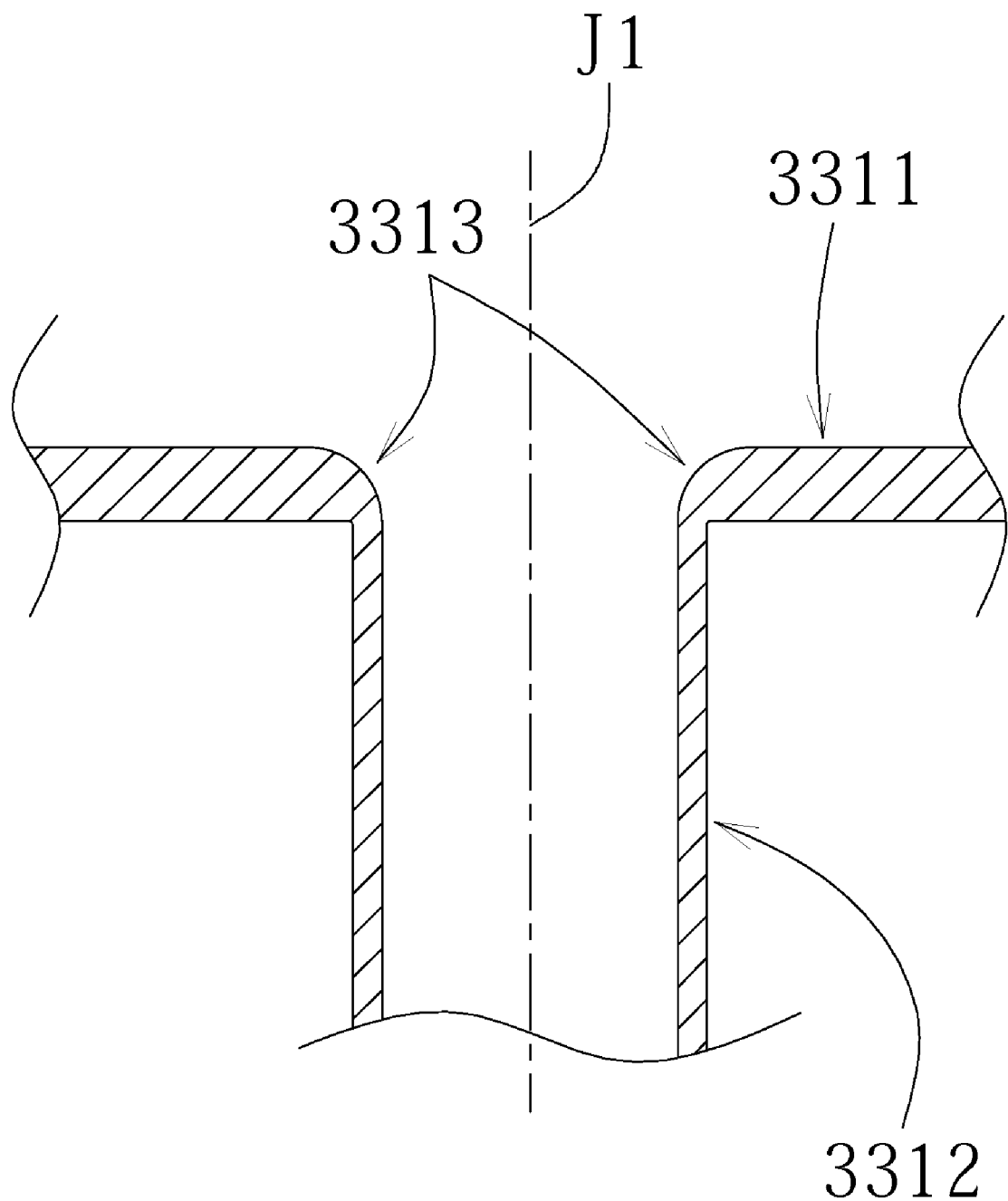
Figure 10:
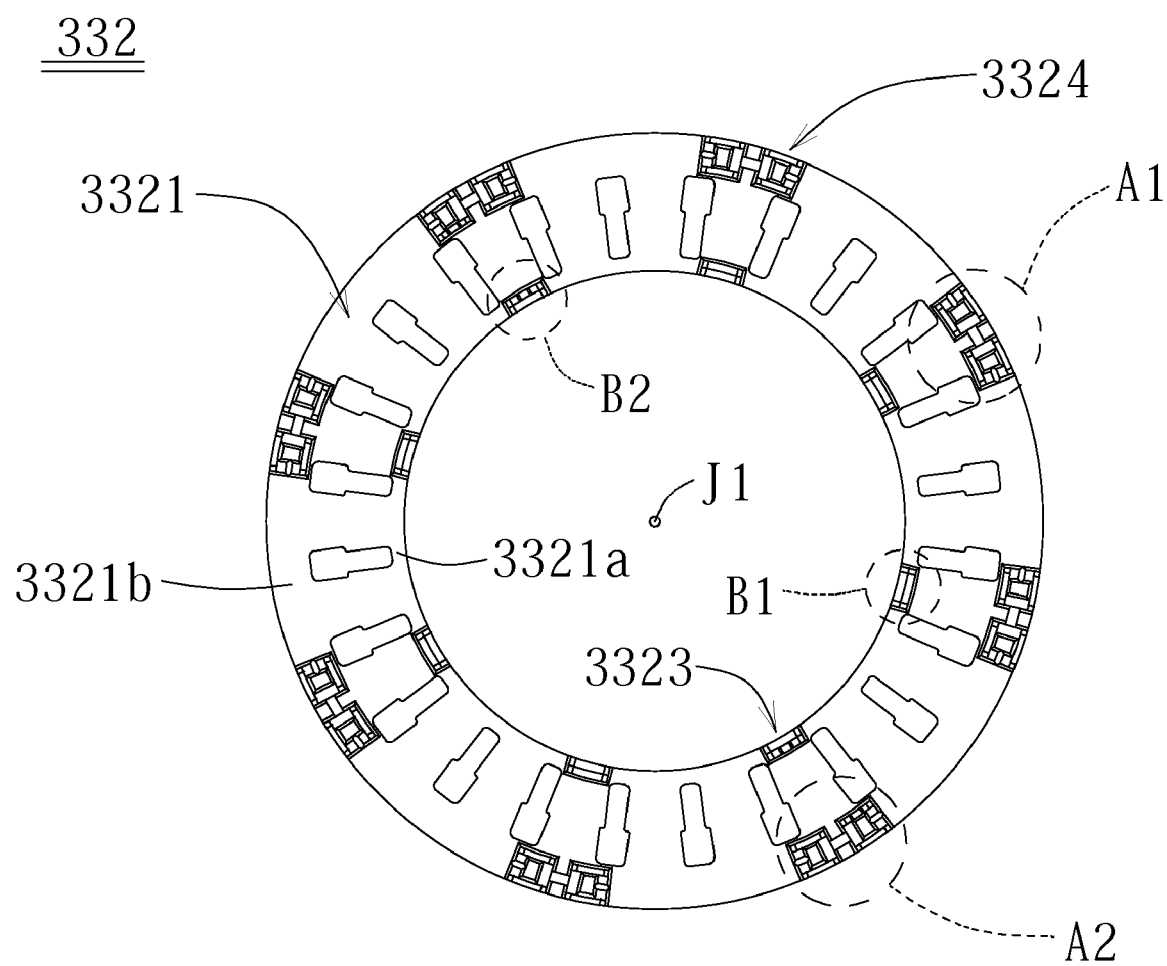
FIG. 10 is a schematic plan view of a lower insulator when viewed in the axial direction.
Figure 11:
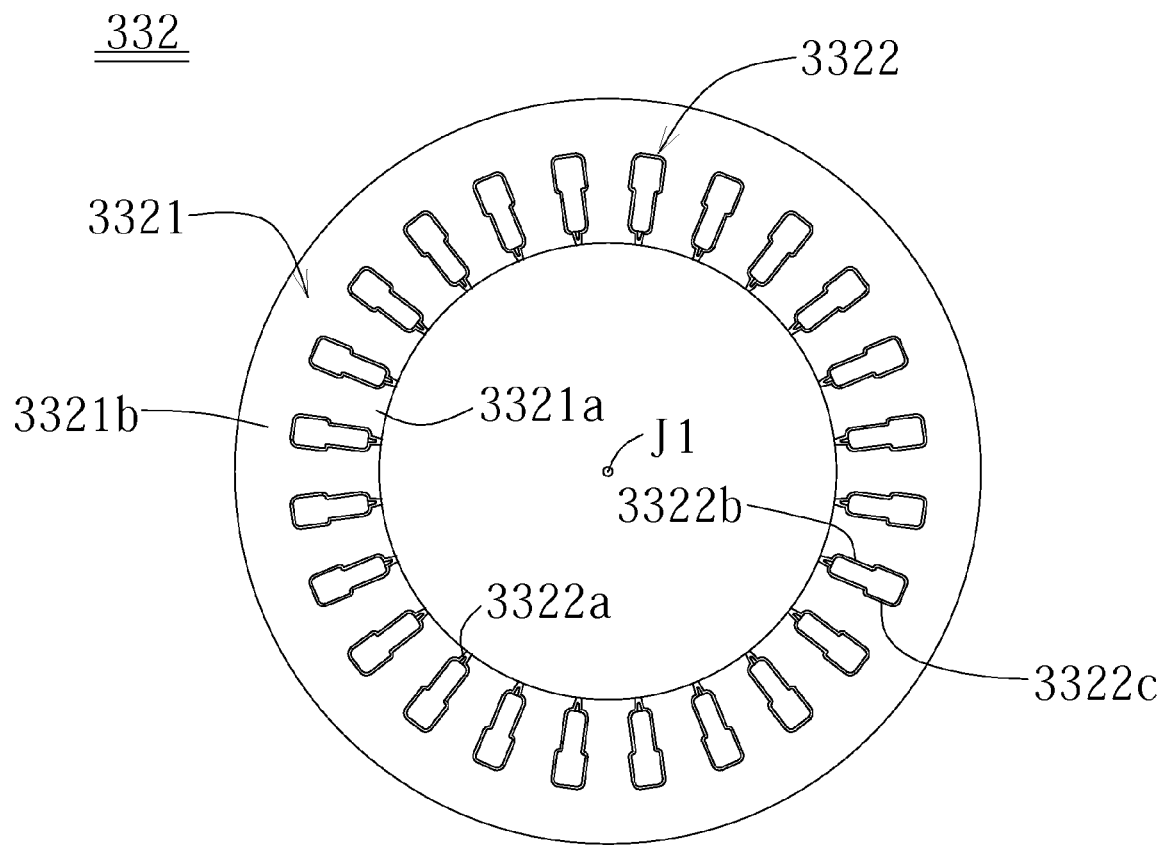
FIG. 11 is a schematic plan view of the lower insulator when viewed in the axial direction from the opposite side to FIG. 10.
Figure 12:
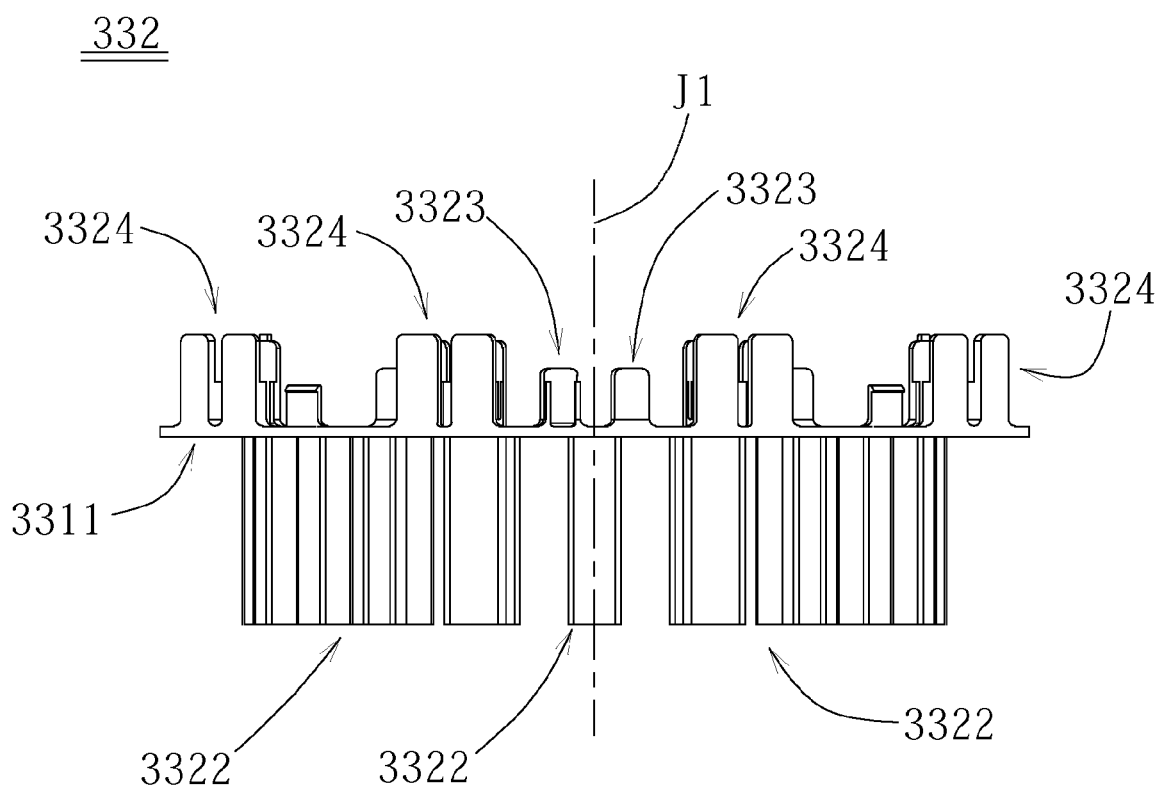
FIG. 12 is a schematic side view of the lower insulator when viewed from a side.
Figure 15:
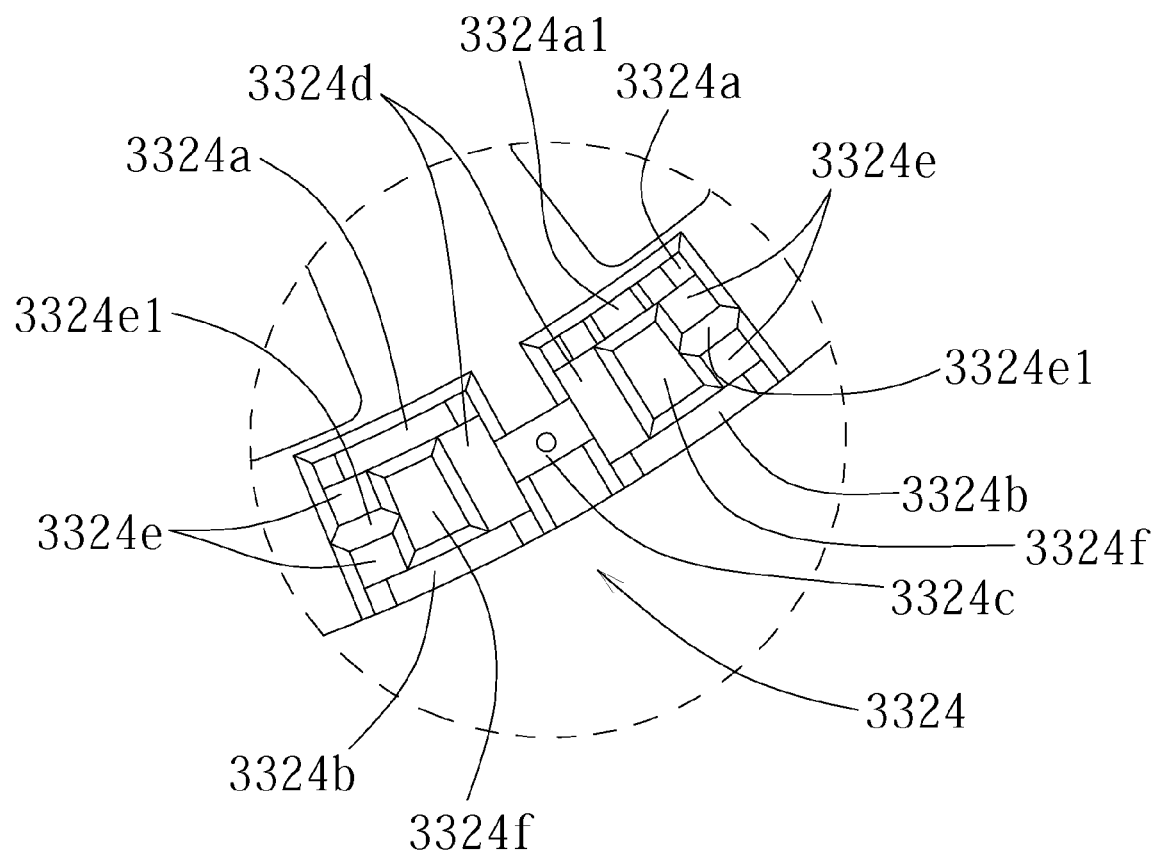
FIG. 15 is a schematic enlarged view of a portion in FIG. 10.
Figure 16:
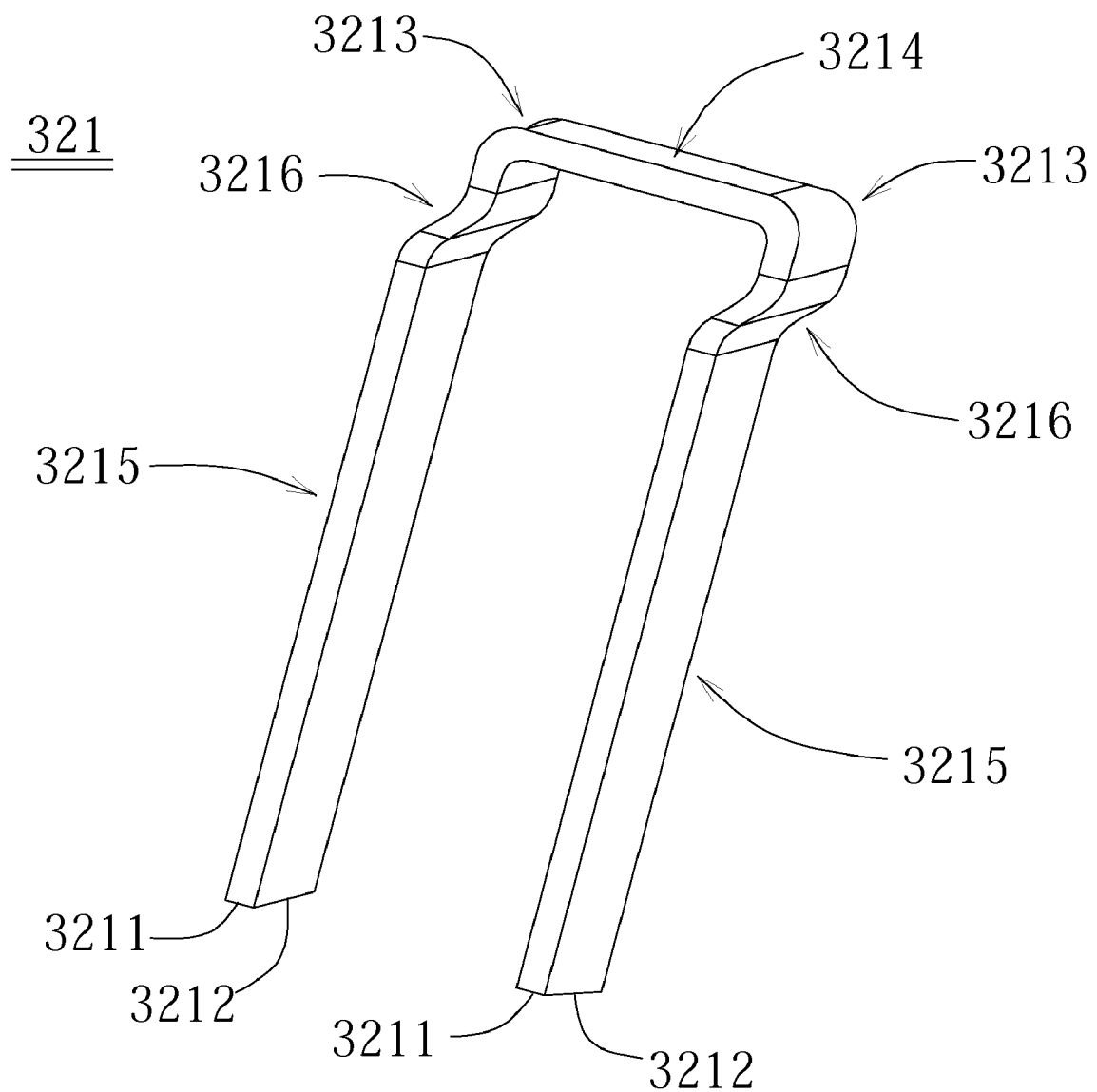
FIG. 16 is a schematic perspective view of an inner conductor of the conductors.
Figure 17:
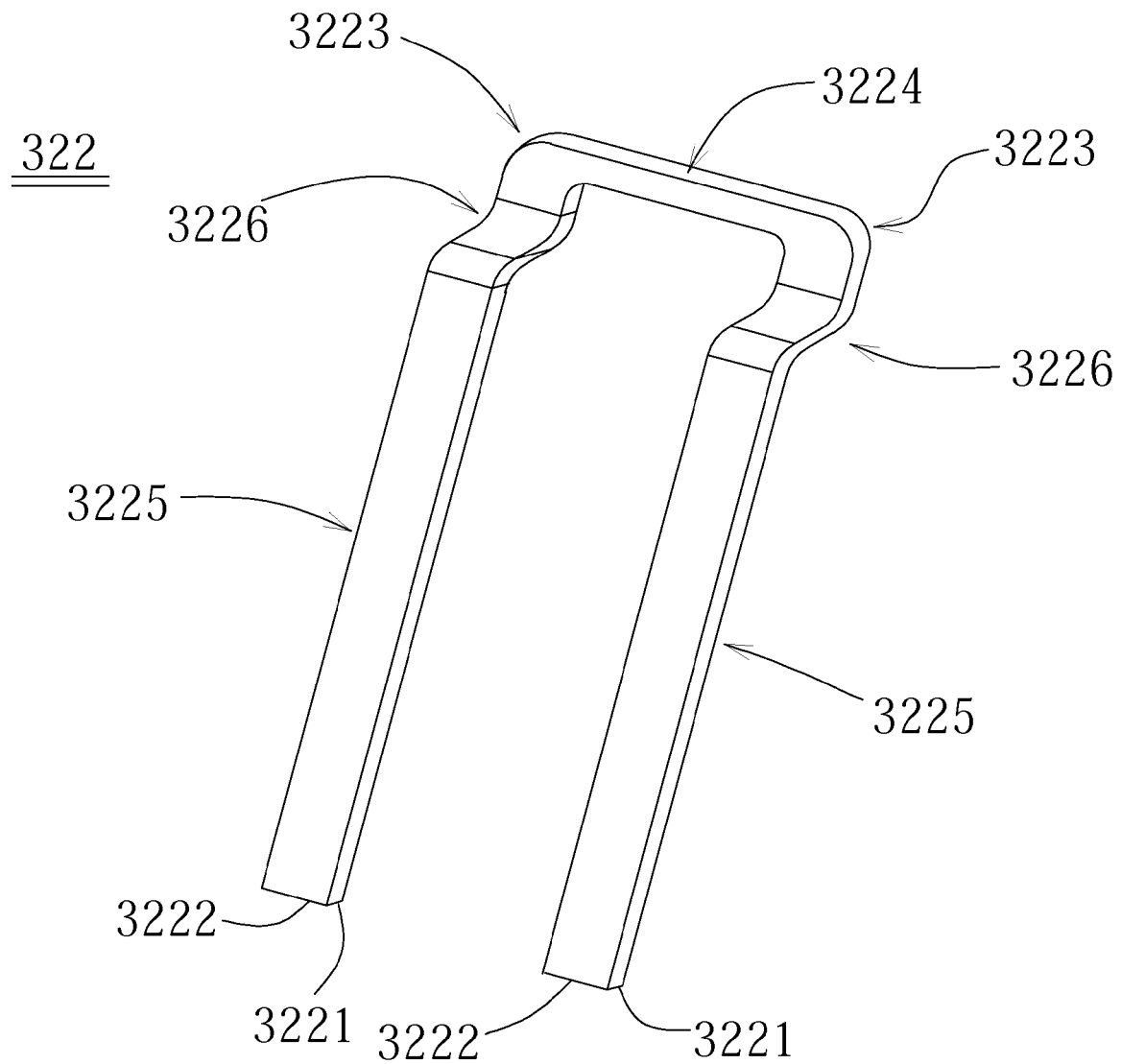
FIG. 17 is a perspective view of an outer conductor of the conductors.
Figure 18:
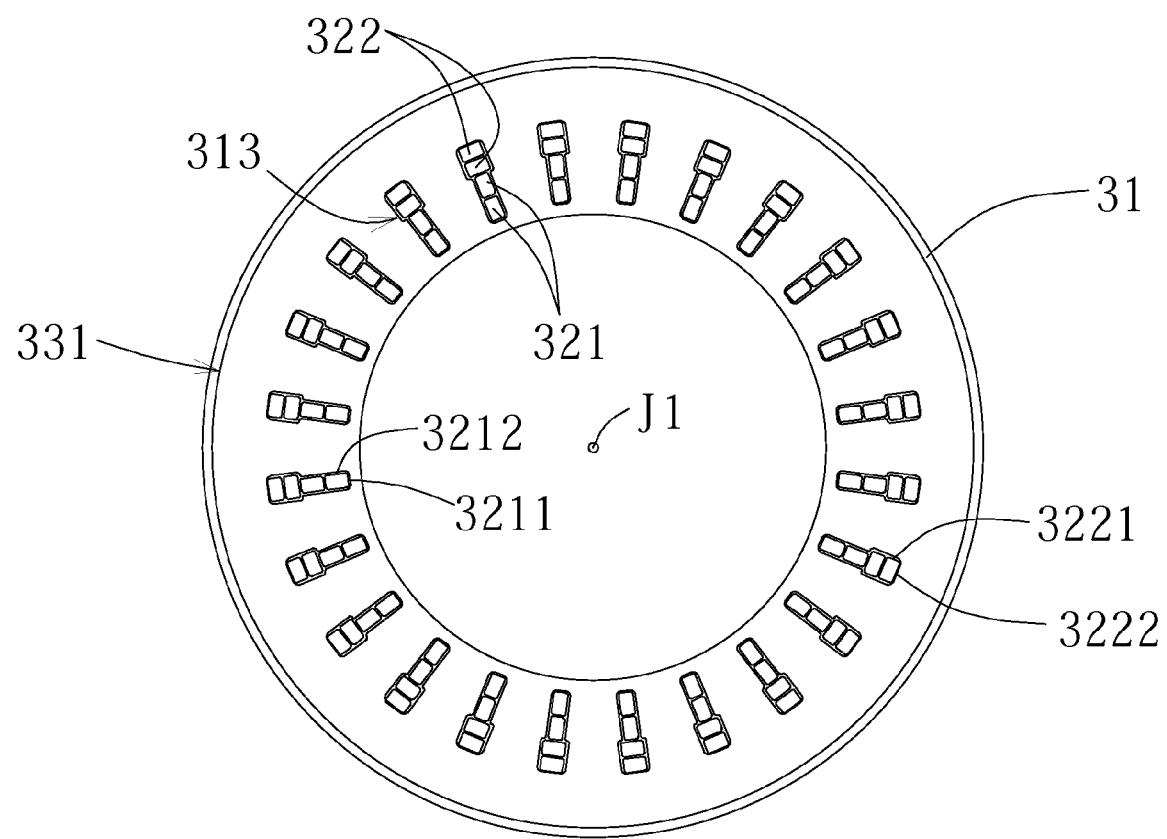
FIG. 18 is a schematic cross-sectional view showing a state in which the conductors are inserted in the structure shown in FIG. 4.
Figure 19A:
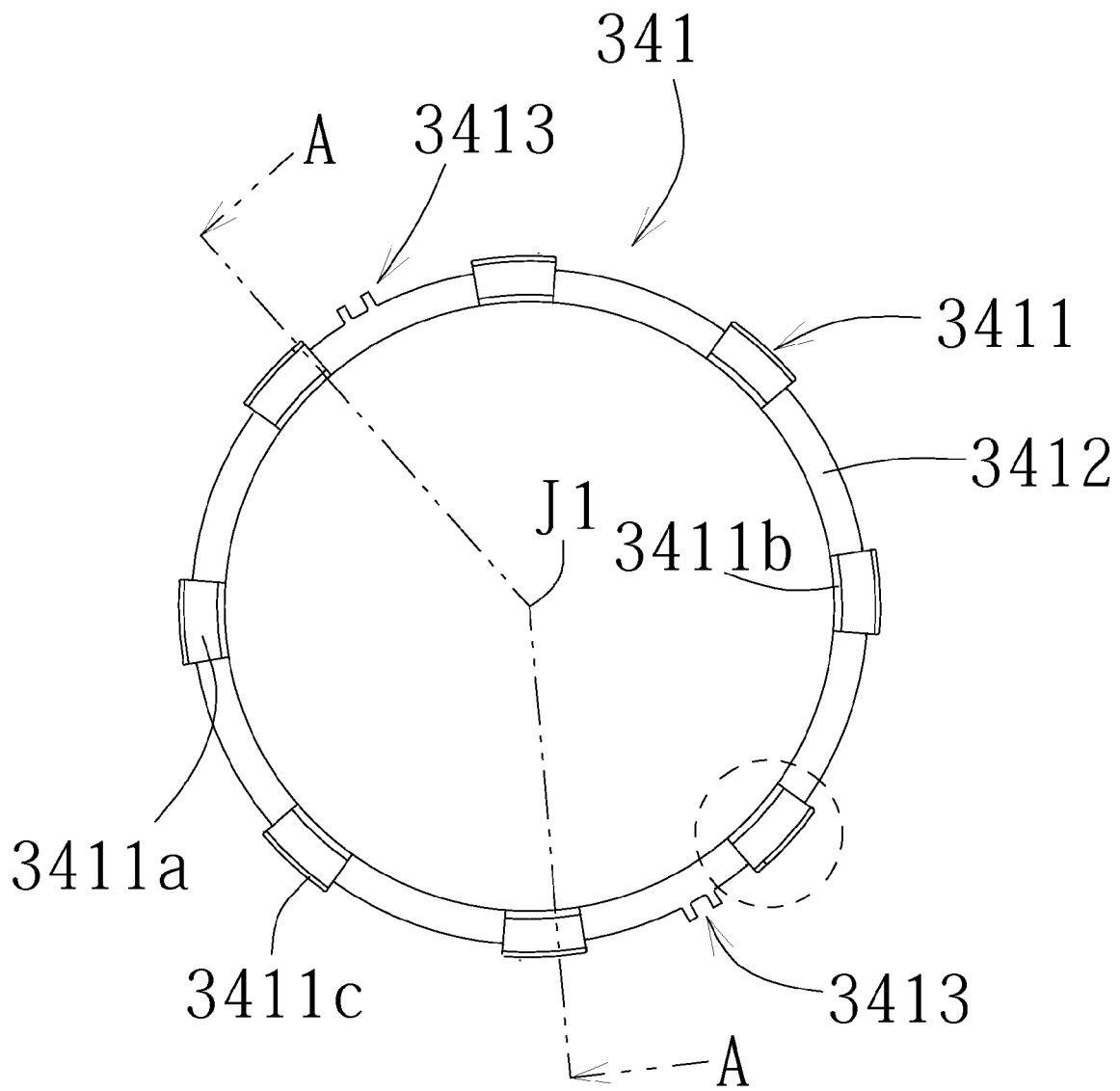
FIGS. 19A to 19C are schematic plan views and a schematic side view of a first inner spacer.
Figure 19B:
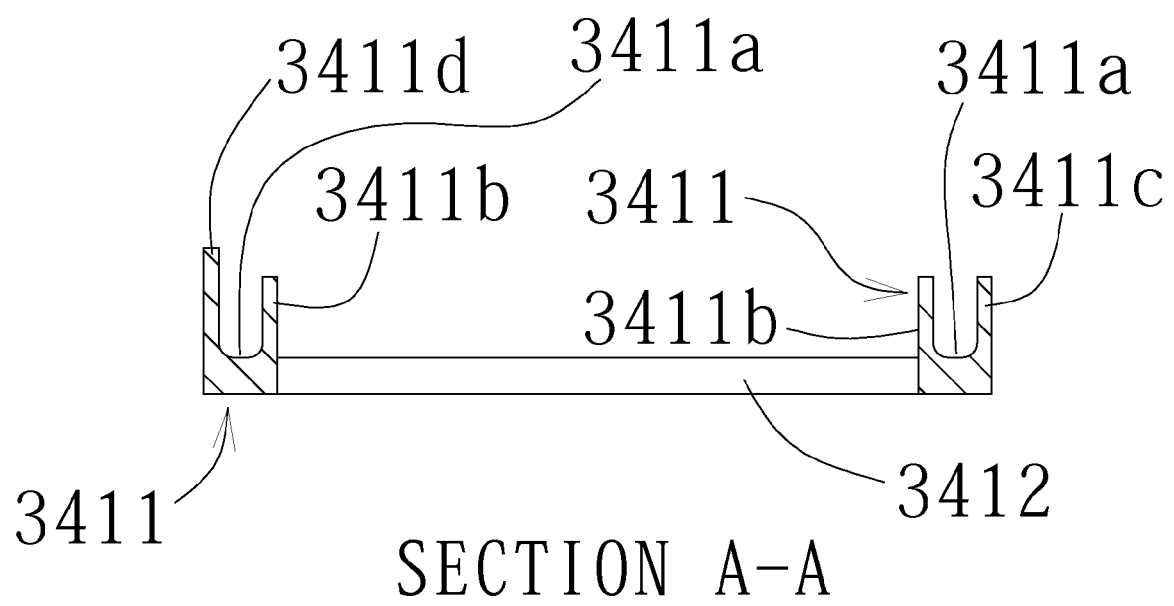
Figure 19C:
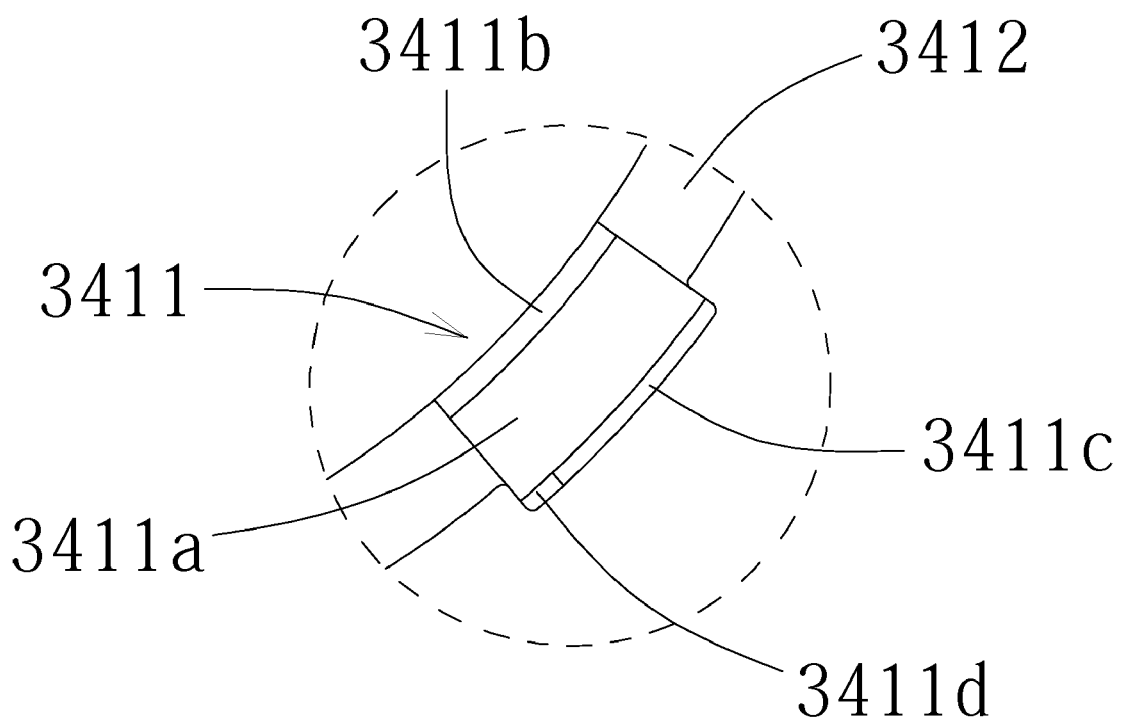
Figure 20A:
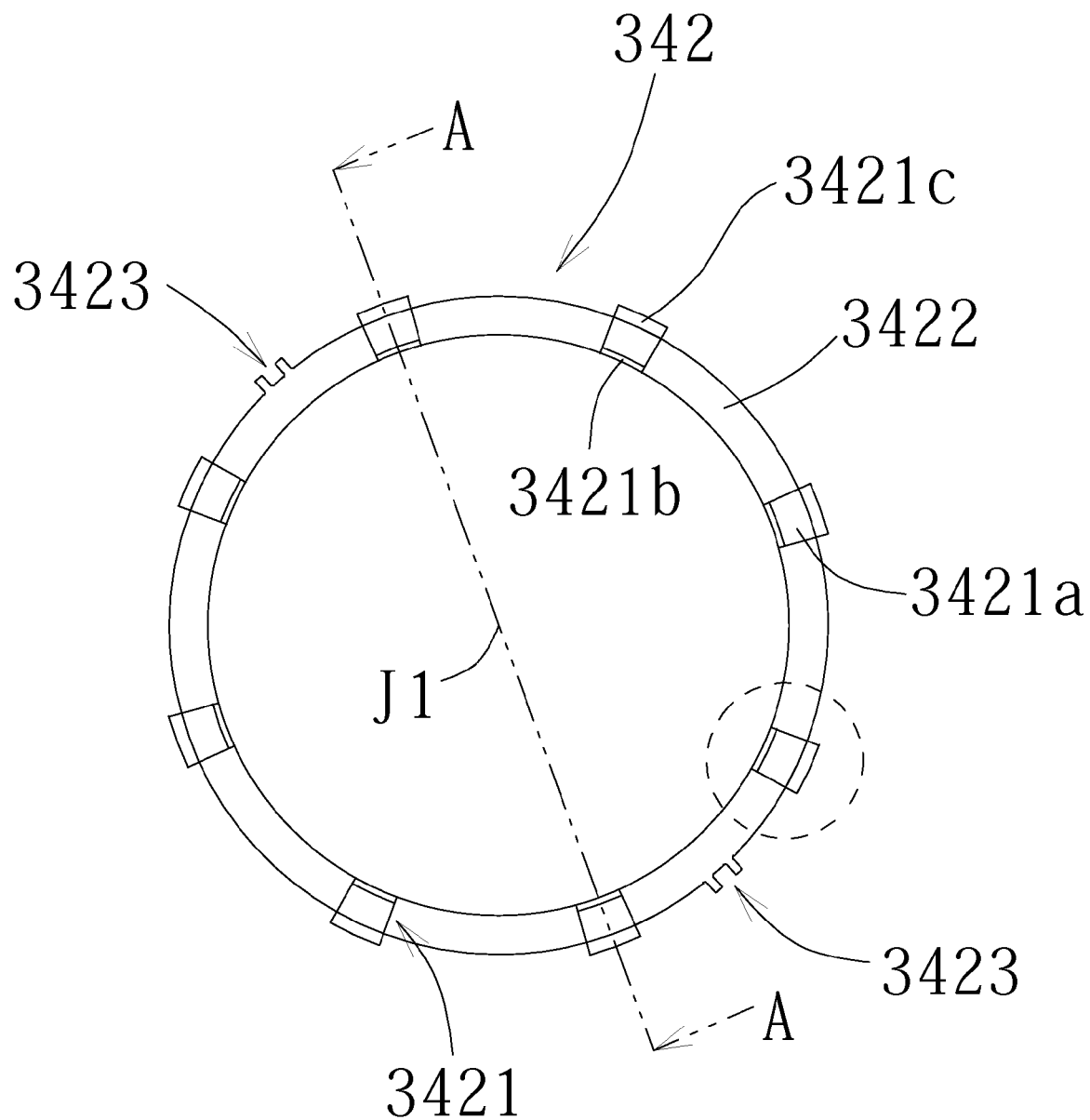
FIGS. 20A to 20C are schematic plan views and a schematic side view of a second inner spacer.
Figure 20B:
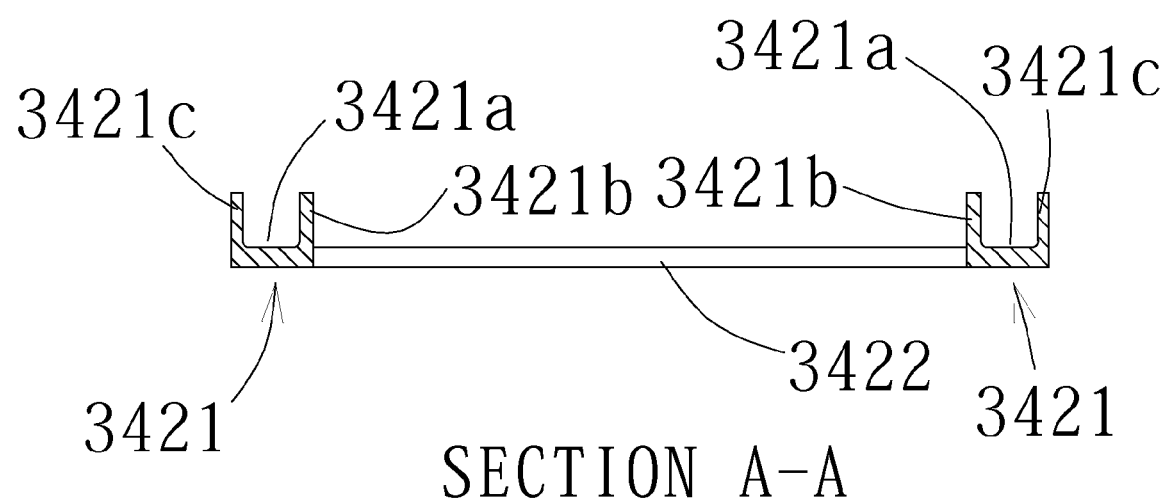
Figure 20C:
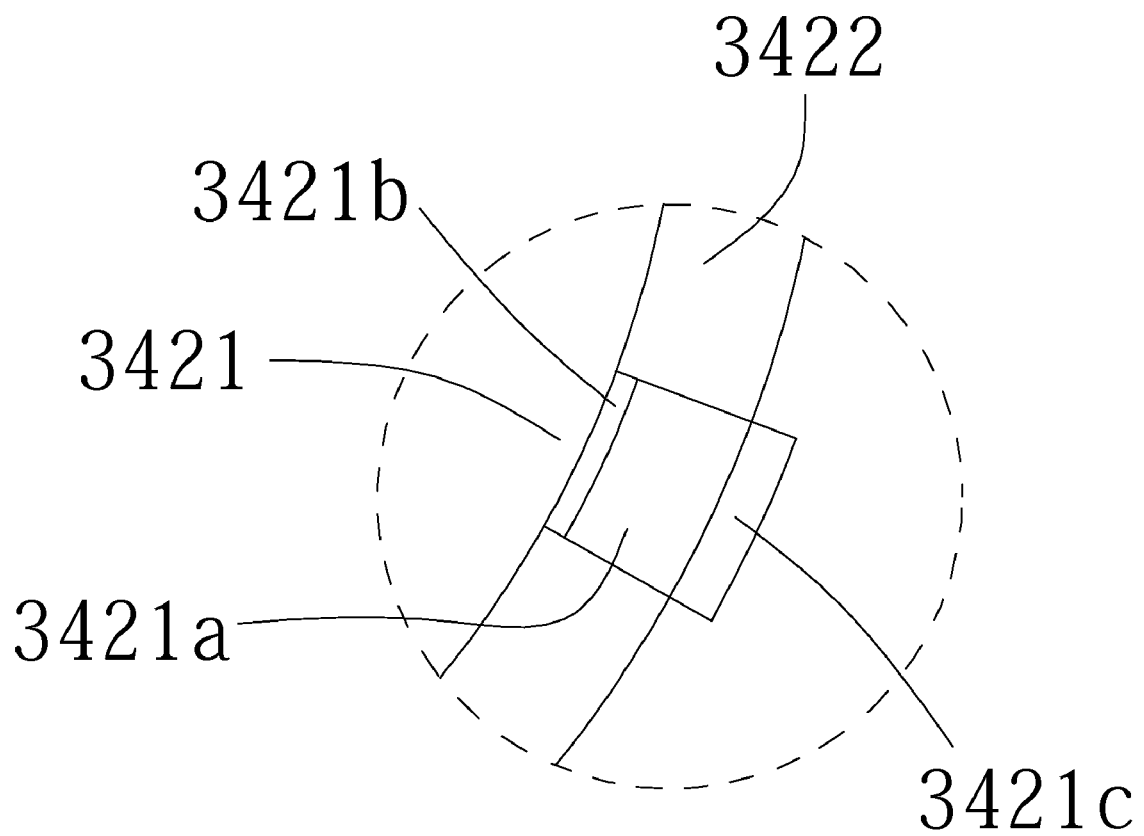
Figure 21A:
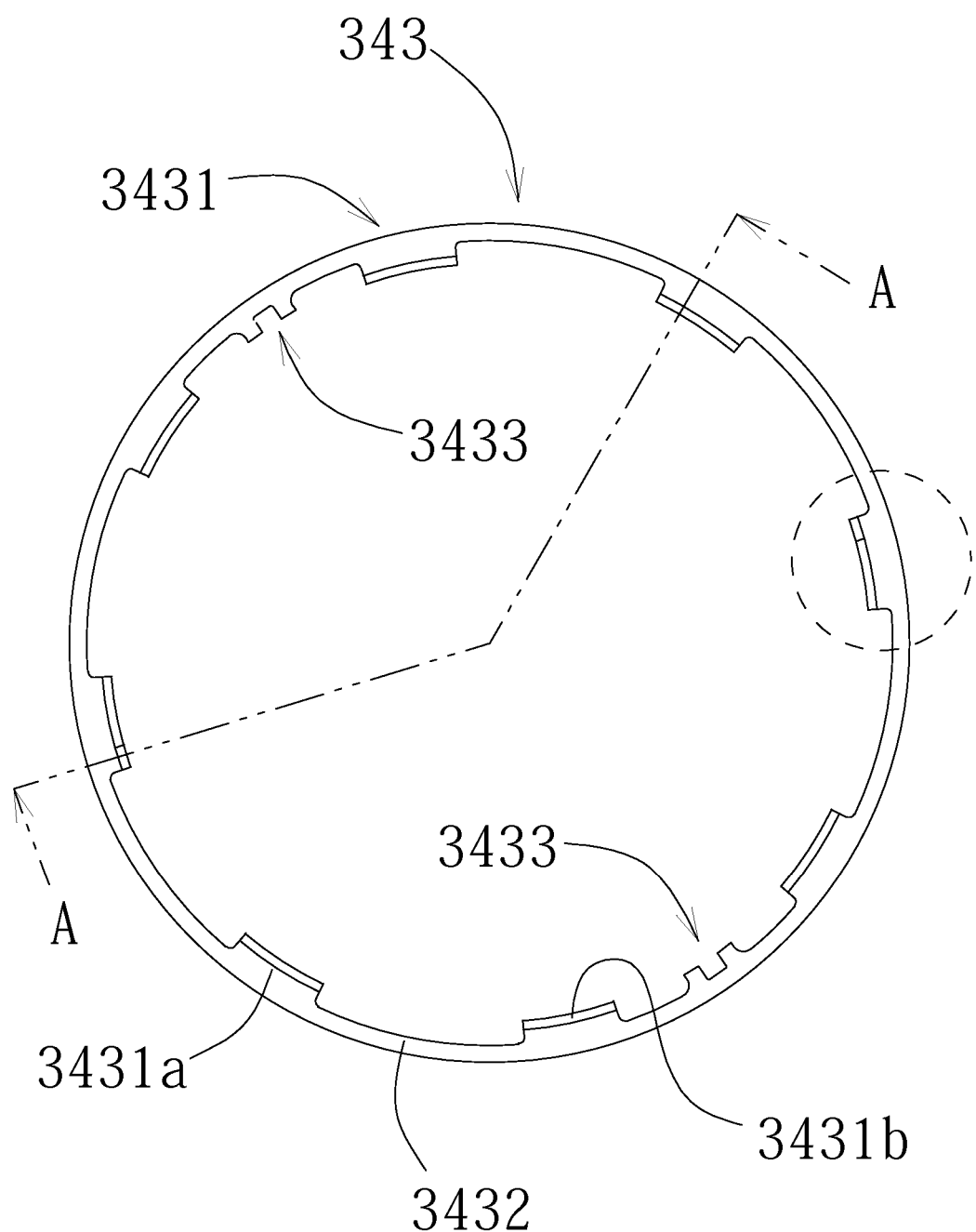
FIGS. 21A to 21C are schematic plan views and a schematic side view of a first outer spacer.
Figure 21B:
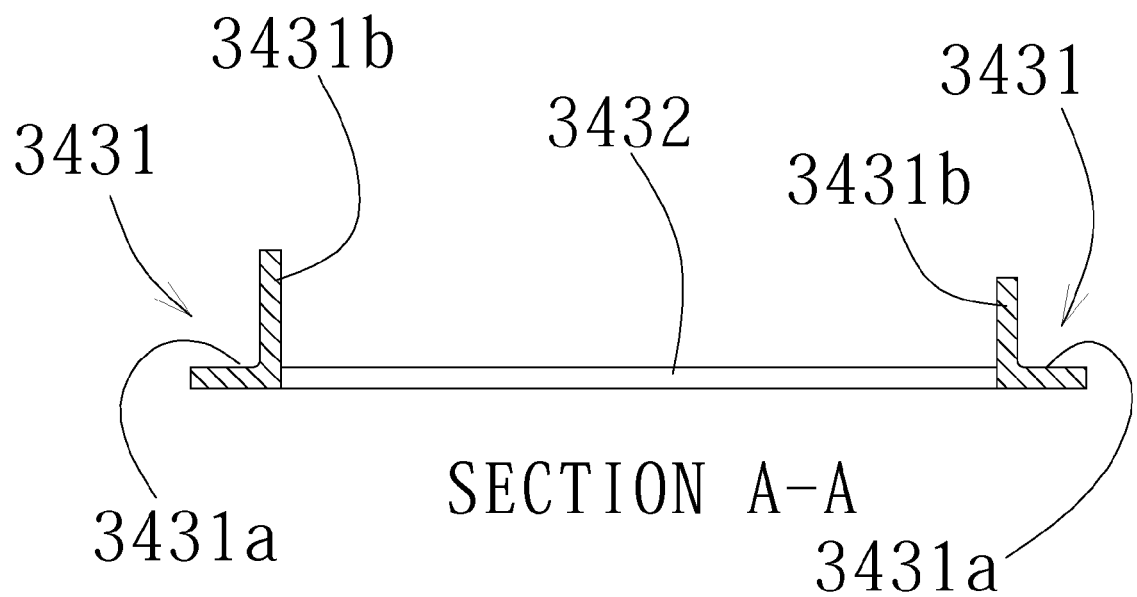
Figure 21C:
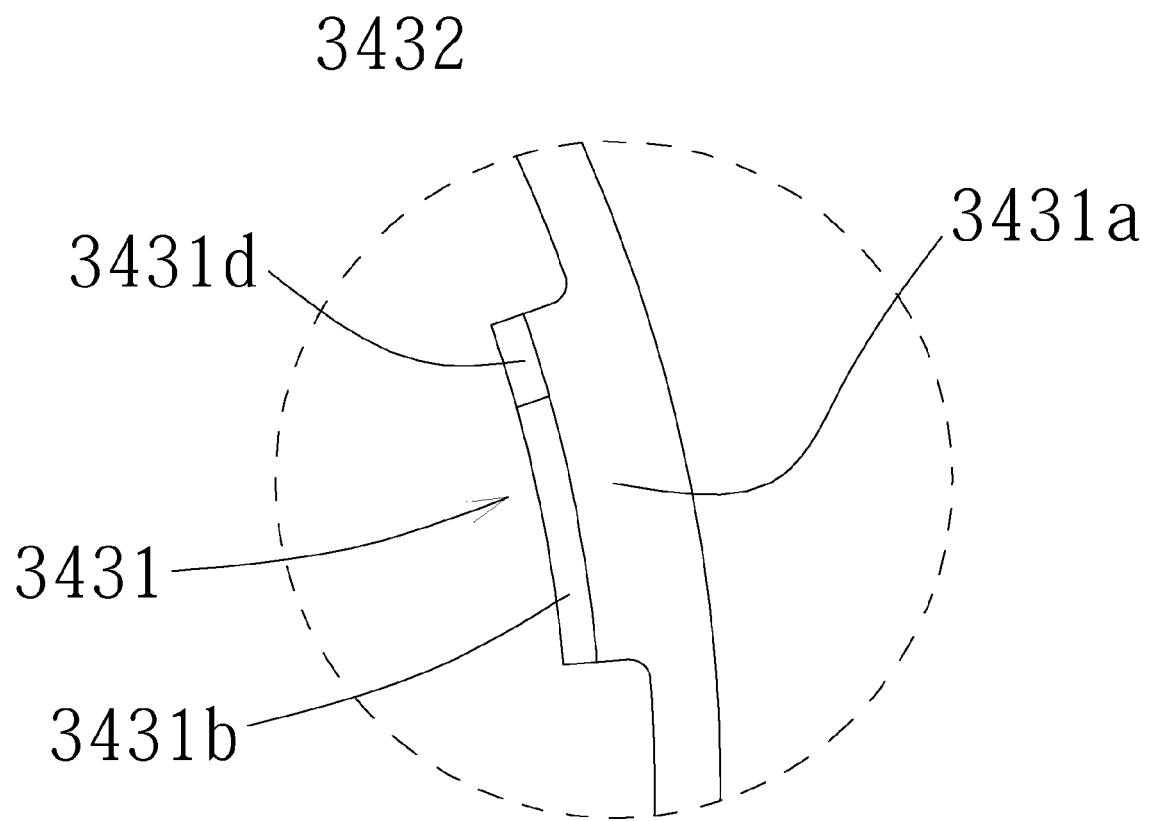
Figure 22A:
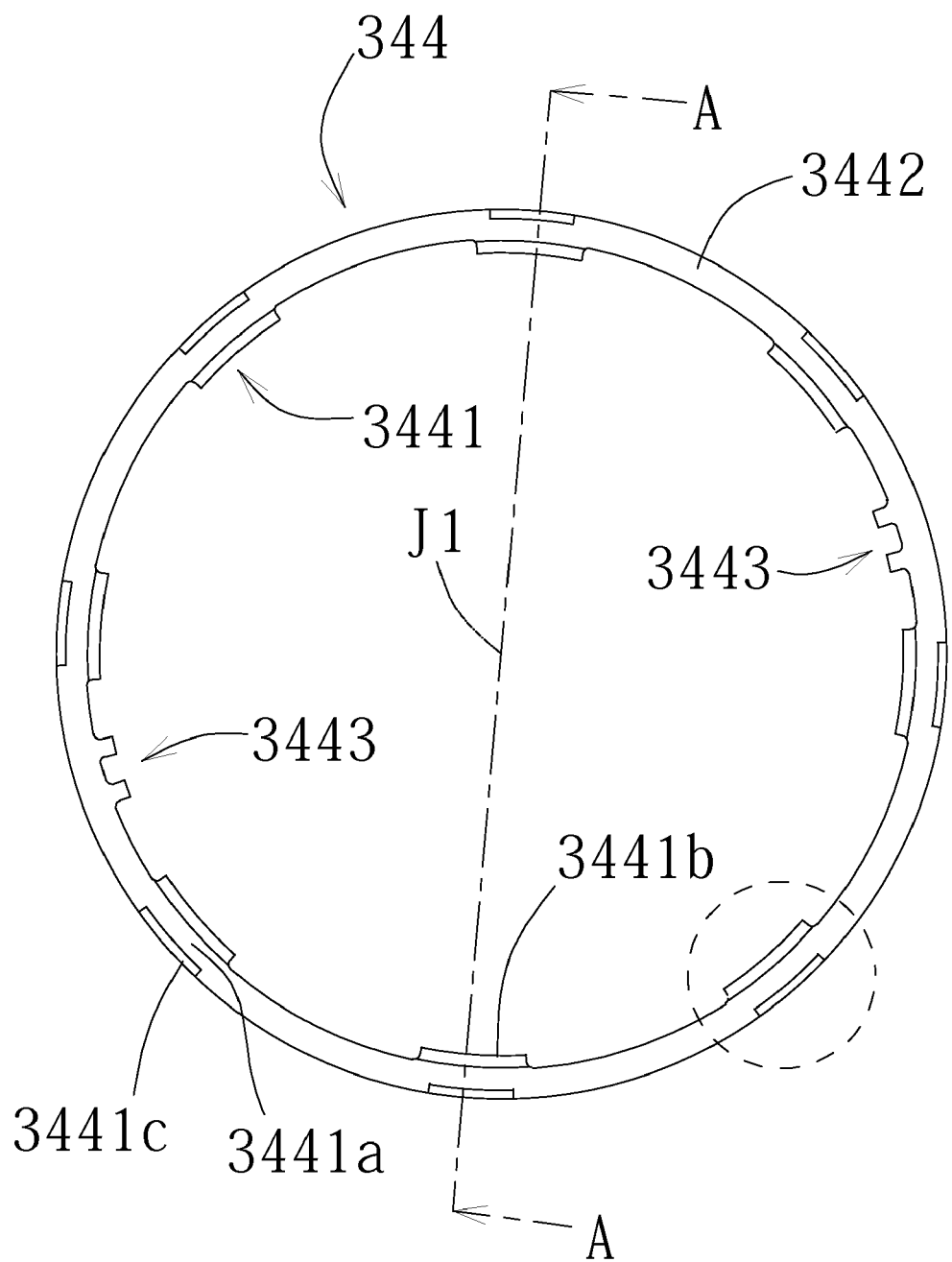
FIGS. 22A to 22C are schematic plan views and a schematic side view of a second outer spacer.
Figure 22B:
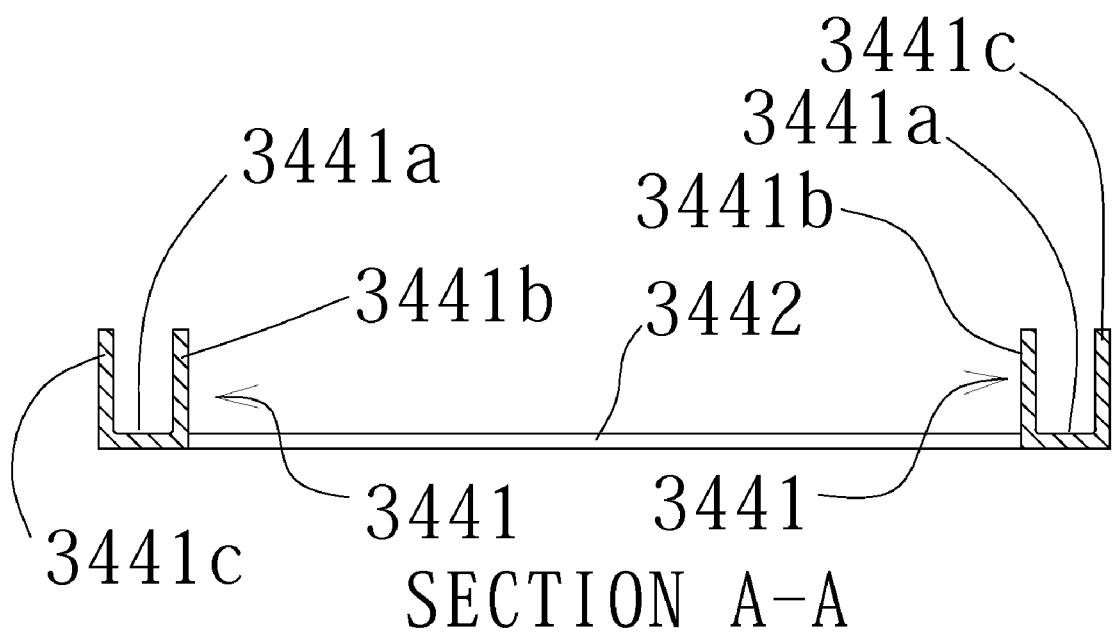
Figure 22C:
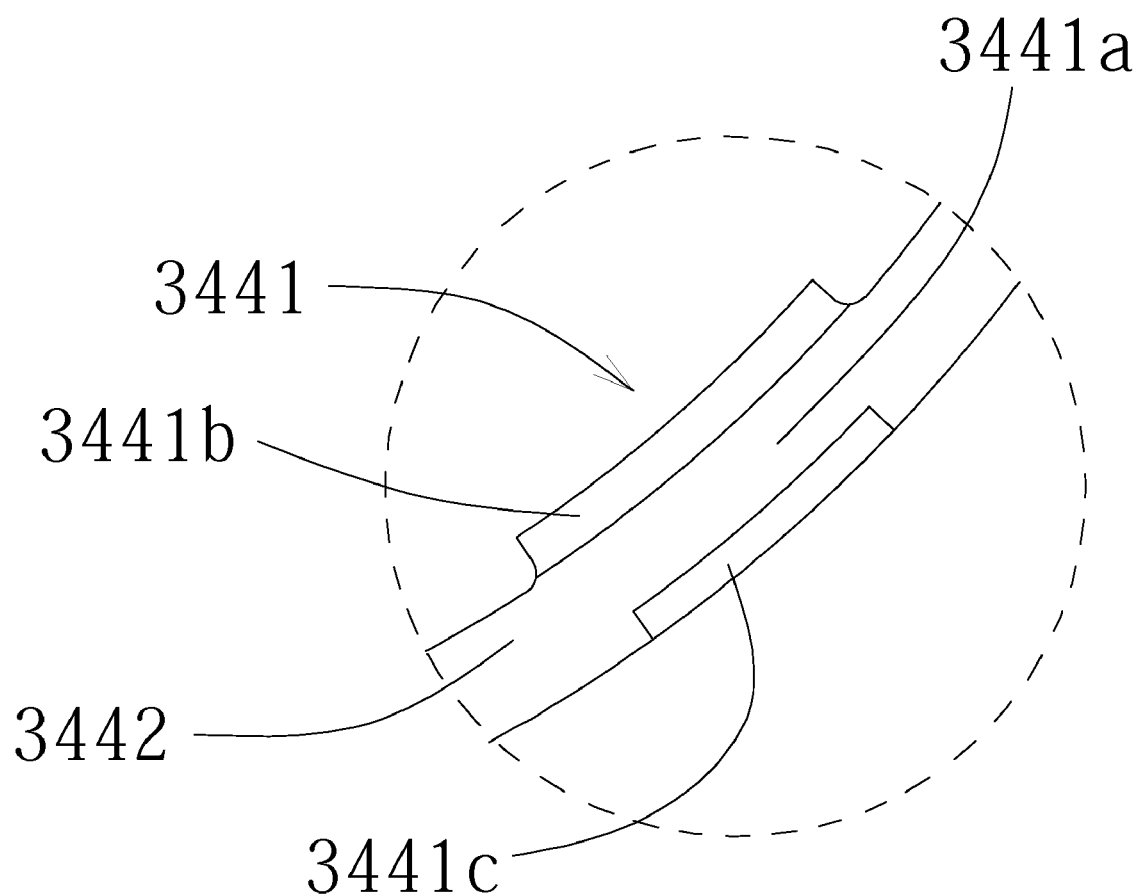
Figure 23:
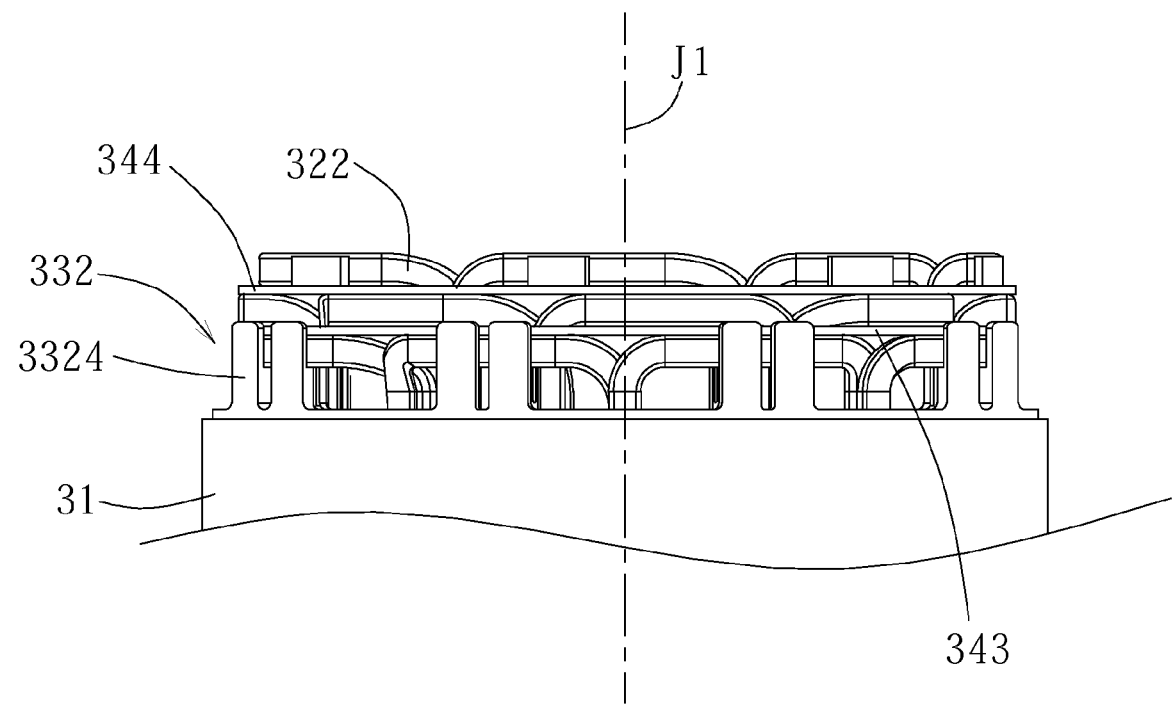
FIG. 23 is a schematic side view shown in an enlarged manner of a lower portion of the armature with the conductors inserted.

The structure of the armature 3 according to the present preferred embodiment will be described below with reference to FIGS. 3 to 23. FIG. 3 is a plan view of the armature core 31 when viewed from above. FIG. 4 is a plan view of the armature core 31 of FIG. 3 mounted with the insulator 33 when viewed from below. FIG. 5 is a side view of the structure shown in FIG. 4. Also, FIG. 5 is partly a cross-sectional view. FIG. 6 is a plan view of an upper insulator 331 when viewed in the axial direction. FIG. 7 is a plan view of the upper insulator 331 when viewed in the axial direction from the opposite side to FIG. 6. FIG. 8 is a side view of the upper insulator 331 when viewed from a side. FIGS. 9A and 9B are enlarged views of a portion in FIG. 7. FIG. 10 is a plan view of a lower insulator 332 when viewed in the axial direction. FIG. 11 is a plan view of the lower insulator when viewed in the axial direction from the opposite side to FIG. 10. FIG. 12 is a side view of the lower insulator 332 when viewed from a side. FIGS. 13A to 13D are enlarged views of portions in FIG. 10. FIGS. 14A to 14D are enlarged views of portions in FIG. 10. FIG. 15 is an enlarged view of a portion in FIG. 10. FIG. 16 is a perspective view of an inner conductor 321 of the conductors 32. FIG. 17 is a perspective view of an outer conductor 322 of the conductors 32. FIG. 18 is a schematic cross-sectional view showing a state in which the conductors 32 are inserted in the structure shown in FIG. 4. FIGS. 19A to 19C are plan views and a side view of a first inner spacer. FIGS. 20A to 20C are plan views and a side view of a second inner spacer. FIGS. 21A to 21C are plan views and a side view of a first outer spacer. FIGS. 22A to 22C are plan views and a side view of a second outer spacer. FIG. 23 is a side view shown in an enlarged manner of a lower portion of the armature 3 with the conductors 32 inserted.

Referring to FIG. 3, the armature core 31 has a plurality of teeth 311 and an annular core back 312. The teeth 311 extend toward the central axis J1 and are spaced apart from one another in the circumferential direction. The core back 312 couples the teeth 311 at the radially outer side along the circumferential direction. In the present preferred embodiment, twenty-four teeth 311 are provided. A slot 313 is a space defined by the inner peripheral surface of the core back 312 and the opposing surfaces of two circumferentially adjacent teeth 311.

Circumferentially extending portions 3111 are provided at the inner peripheral portions of each tooth 311. The circumferentially extending portions 3111 oppose each other circumferentially to make the smallest gap in the circumferential width of each slot 313.

The teeth 311 have, on the radially inner side, enlarged width portions 3112 with a large circumferential width in comparison with the radially outer side of the teeth 311. The radial length of an enlarged width portion 3112 is at least half the radial length of a tooth 311.

Each slot 313 has a narrow width portion 3131 and an enlarged width portion 3132. The narrow width portions 3131 correspond to the radially inner portions (i.e., the enlarged width portions 3112) of the teeth 311, and the enlarged width portions 3132 correspond to the radially outer portions (i.e., the radially outer side of the enlarged width portions 3112) of the teeth 311.

Referring to FIGS. 4 and 5, the insulator 33 is preferably formed from a resin, or any other suitable material, having a good electrically insulating property through injection molding. The insulator 33 includes the upper insulator 331, the lower insulator 332, and a middle insulator 333. The upper insulator 331 covers the upper end surface of the armature core 31. The lower insulator 332 covers the lower end surface of the armature core 31. The middle insulator 333 is axially interposed between the upper insulator 331 and the lower insulator 332 and covers the peripheral surfaces of the slots 313.

Referring to FIGS. 6 to 8, the upper insulator 331 has a lid 3311 and slot insulators 3312. The lid 3311 covers the upper end surface of the armature core 31. The slot insulators 3312 are inserted into the slots 313 to cover each peripheral surface of the slots. The slot insulators 3312 have a tubular shape that is approximately identical to that of the slots 313 of the armature core 31.

Referring to FIG. 6, the lid 3311 has an annular shape. The lid 3311 has an inner peripheral ring 3311a and an outer peripheral ring 3311b, both of which have an annular shape. The inner peripheral ring 3311a couples the inner peripheral edges of the teeth 311 along the circumferential direction. The outer peripheral ring 3311b covers the upper surface of the core back 312. The outer peripheral ring 3311b is preferably smaller in outer diameter than the core back 312. The inner peripheral ring 3311a covers the circumferentially extending portions 3111 of the teeth 311 to link them along the circumferential direction.

Referring to FIGS. 7 to 9B, the slot insulators 3312 meet the side surfaces of the slots 313 (i.e., the opposing side surfaces of each two circumferentially adjacent teeth 311 and the inner surface of the core back 312 as shown in FIG. 3). Each slot insulator 3312 is provided with a blocking portion 3312a inserted between the opposing surfaces of the circumferentially extending portions 3111 of a tooth 311. That is, a slot insulator 3312 has a narrow width portion 3312b that corresponds in radial position to the narrow width portion 3131 of a slot 313, and an enlarged width portion 3312c that corresponds in radial position to the enlarged width portion 3132 of a slot 313. The blocking portions 3312a are provided as inner peripheral edges of the narrow width portions 3131.

The slot insulators 3312 are coupled at the blocking portions 3312a in an approximately tubular form along the circumferential direction. With this structure, the slot insulators 3312 have increased strength as compared with slot insulators without the blocking portions 3312a, i.e., slot insulators having cuts penetrating along the axial direction. As such, the slot insulators 3312 having a tubular form with the blocking portions 3312a can maintain the required strength even when the thickness of the slot insulators 3312 is reduced. In the case of the slot insulators having cuts penetrating along the axial direction, the portions corresponding to the slot insulators 3312 are liable to incline greatly toward the laminating direction of the armature core 31 due to lack of strength. As a result, it becomes difficult to insert the slot insulators into the slots 313. The portions corresponding to the slot insulators 3312 might be increased in thickness in order to achieve the sufficient strength of the slot insulators. However, the increased thickness of the slot insulators reduces space for inserting the conductors 32. The thickness of the conductors 32 therefore has to be reduced, which results in increased electrical resistance of the conductors 32, leading to the problem of increased heat generation of the conductors 32. In contrast, the blocking portions 3312a increase the strength of the slot insulators 3312 in the armature 3 according to the present preferred embodiment, thereby precluding such a problem. Thus, the slot insulators 3312 can be made to have a small thickness. Consequently, in the plan view as seen in the axial direction, there can be provided an increased space in the slots 313 with the slot insulators 3312 fitted therein, so that conductors 32 having a large thickness can be selected. Therefore, the electrical resistance of the conductors 32 can be reduced, thereby enhancing heat dissipation.

As shown in FIG. 9A, the thickness of a blocking portion 3312a is made large in comparison with the thickness of the remaining portions of the slot insulator 3312. The blocking portions 3312a are disposed where the conductors 32, when inserted, are not present, and thus are irrelevant to the abovementioned space in the slots 313 with the slot insulators 3312 fitted therein. Additionally, by designing the blocking portions 3312a to have a larger thickness, the insulating resin for forming the slot insulators 3312 can flow smoothly during injection molding. This makes it possible to avoid mold failure even when the thickness of the slot insulators 3312 except the blocking portions 3312a is made small. According to the present preferred embodiment, the thickness H1 of the slot insulator 3312 is preferably about 0.5 mm, while the thickness H2 of the blocking portion 3312a is preferably about 1.0 mm, for example. Furthermore, the provision of the blocking portions 3312a permits the extension of the slot insulators 3312 in the axial direction while having a small thickness.

As shown in FIG. 9B, a connecting portion 3313 between the upper edge of each slot insulator 3312 and the lid 3311 has a curved surface that gradually expands in diameter upward in the axial direction. This structure facilitates releasing of the mold used in injection molding of the slot insulators 3312, thereby preventing a burr from being produced at the connecting portion 3313 along a direction in which the mold is released (i.e., an axial direction from the slot insulators 3313 toward the lid 3311). Also, the circumferential width of the slot insulators 3312 at the connecting portions 3313 can be increased which allows the conductors 32 to be smoothly inserted.

Referring to FIGS. 10 to 12, the lower insulator 332 has a lid 3321 and slot insulators 3322. The lid 3321 covers the lower end surface of the armature core 31. The slot insulators 3322 are inserted into the slots 313 to cover the peripheral surfaces of the slots. The slot insulators 3322 preferably have the same shape as the slot insulators 3312 of the upper insulator 331. Like portions of the slot insulators 3312 of the upper insulator 331 and of the slot insulators 3322 of the lower insulator 332 are designated by the reference numerals with the same signs as used for the slot insulators 3312. That is, each slot insulator 3322 has a blocking portion 3322a, a narrow width portion 3322b, and an enlarged width portion 3322c.

Referring to FIG. 10, the lid 3321 has an annular shape. The lid 3321 has an annular inner peripheral ring 3321a and an annular outer peripheral ring 3321b. The inner peripheral ring 3321a couples the inner peripheral edges of the teeth 311 (see FIG. 3) along the circumferential direction. The outer peripheral ring 3321b covers the upper surface of the core back 312. The outer peripheral ring 3321b is preferably smaller in outer diameter than the core back 312.

The inner peripheral ring 3321a and the outer peripheral ring 3321b of the lid 3321 are provided with inner conductor supporting portions 3323 and outer conductor supporting portions 3324, respectively. Both the conductor supporting portions 3323 and 3324 support the conductors 32 and are molded integrally with the lid 3321.

More than one (for example, eight in the present preferred embodiment) inner conductor supporting portions 3323 are provided at intervals along the circumferential direction. The inner conductor supporting portions 3323 are preferably disposed at positions separate from one another by every two teeth 311 in the circumferential direction.

Figure 13A:
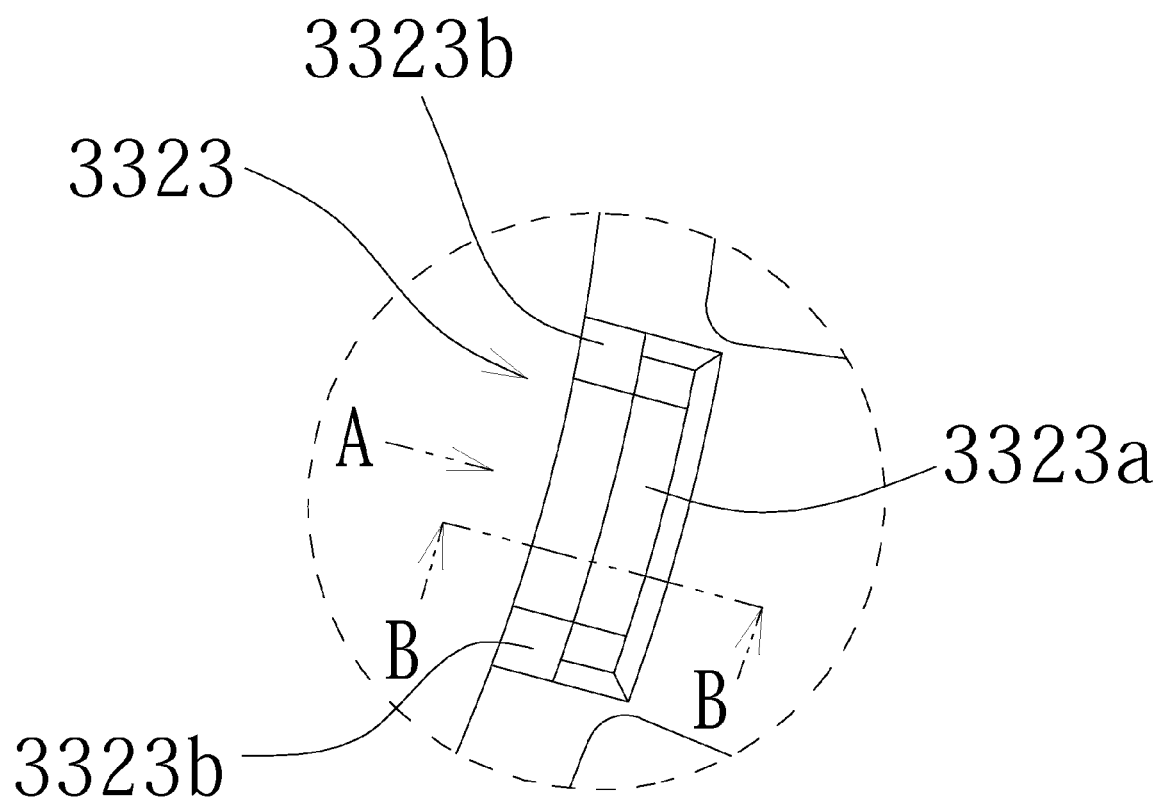
FIGS. 13A to 13D are schematic enlarged views of portions in FIG. 10.
Figure 13B:
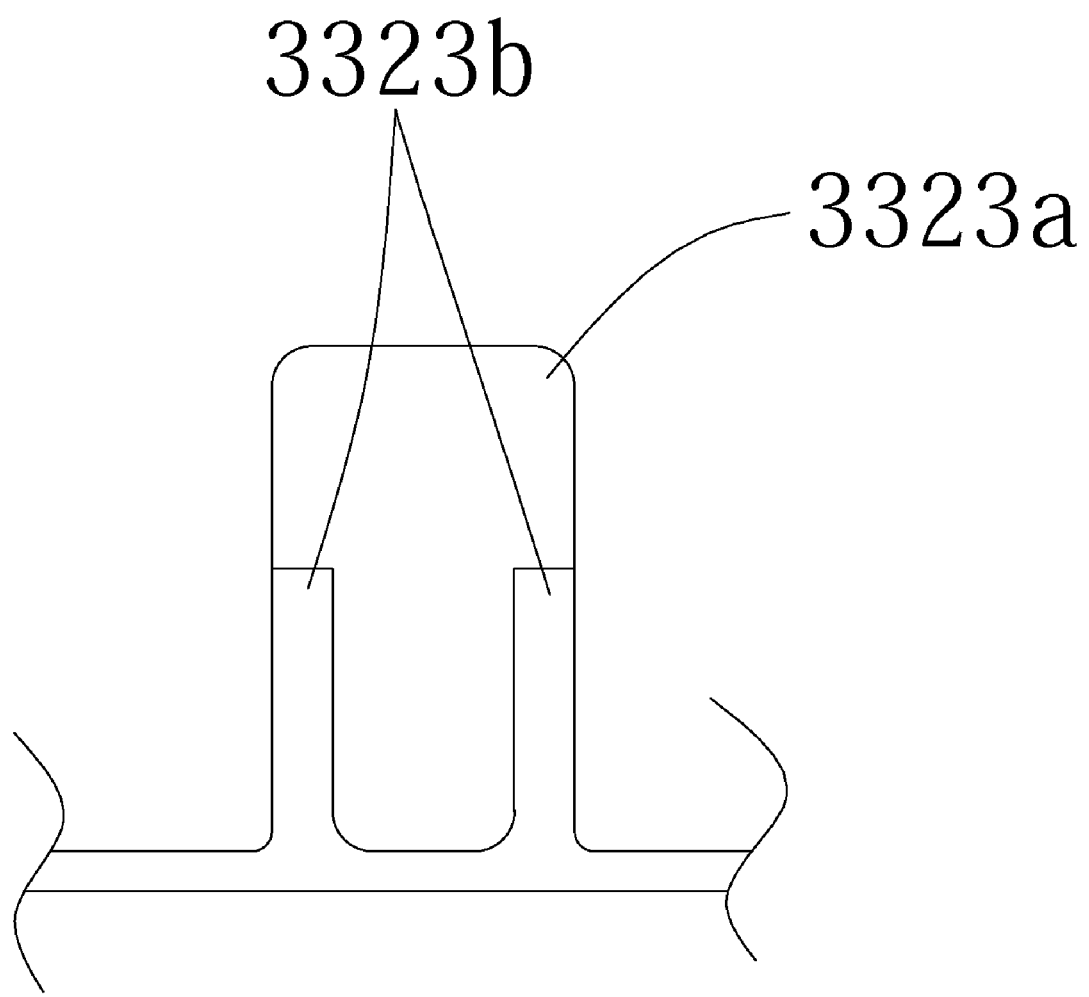
Figure 13C:
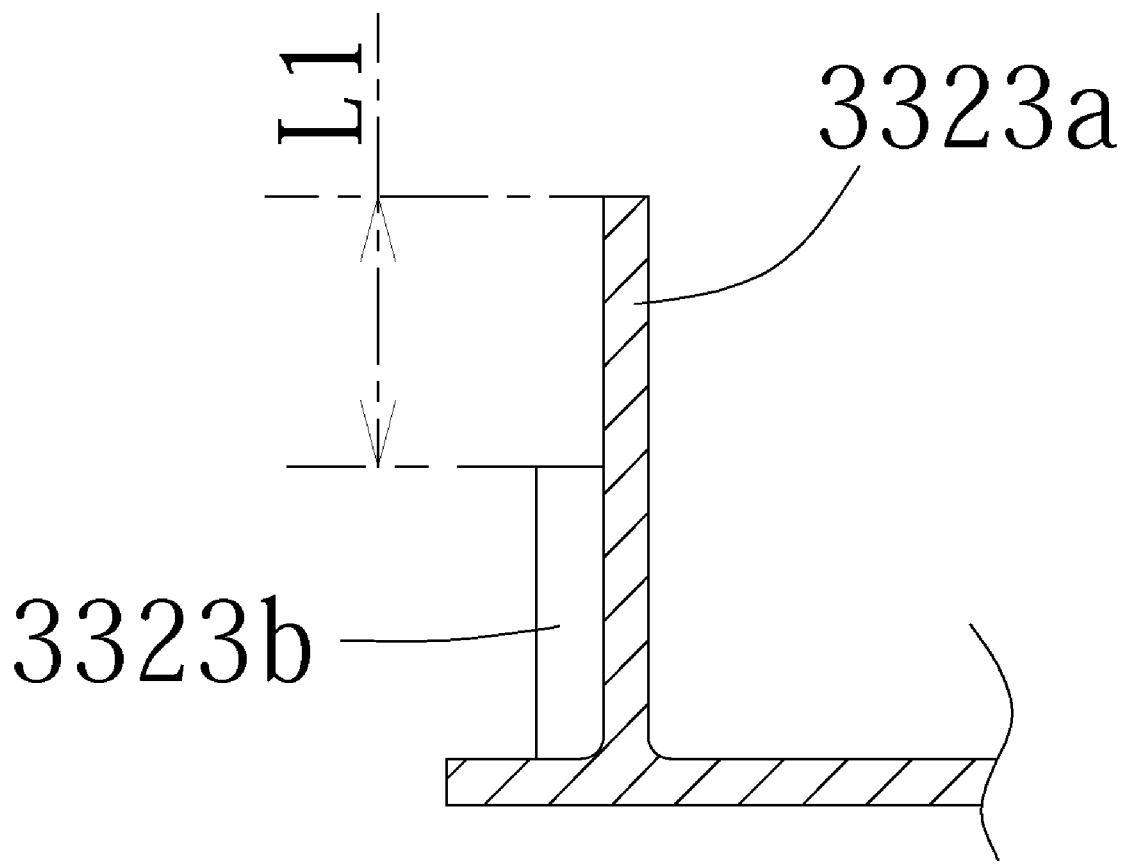

Referring to FIG. 13A which is an enlarged view of portion B1 in FIG. 10, each inner conductor supporting portion 3323 has a peripheral wall 3323a and protruding portions 3323b. The peripheral walls 3323a meet connecting portions 3214 (see. FIG. 16) of the inner conductors 321, which will be described below, to radially locate the inner conductors 321. The protruding portions 3323b are provided on the inner peripheral surface of each peripheral wall 3323a and have a step-like shape protruding radially inward. In each inner conductor supporting portion 3323, two protruding portions 3323b are arranged spaced apart from each other in the circumferential direction (see FIG. 13B). The protruding portions 3323b increase the strength of the peripheral walls 3323a. Moreover, the connecting portions 3214 meet the upper surfaces of the protruding portions 3323b, whereby the connecting portions 3214 are located axially. With this structure, the inner conductors 321 can easily be positioned axially. The axial length L1 from the upper surfaces of the protruding portions 3323b to the upper surface of a peripheral wall 3323a preferably is approximately equal to the axial thickness of the connecting portion 3214 of an inner conductor 321 (see FIG. 13C).

Figure 13D:
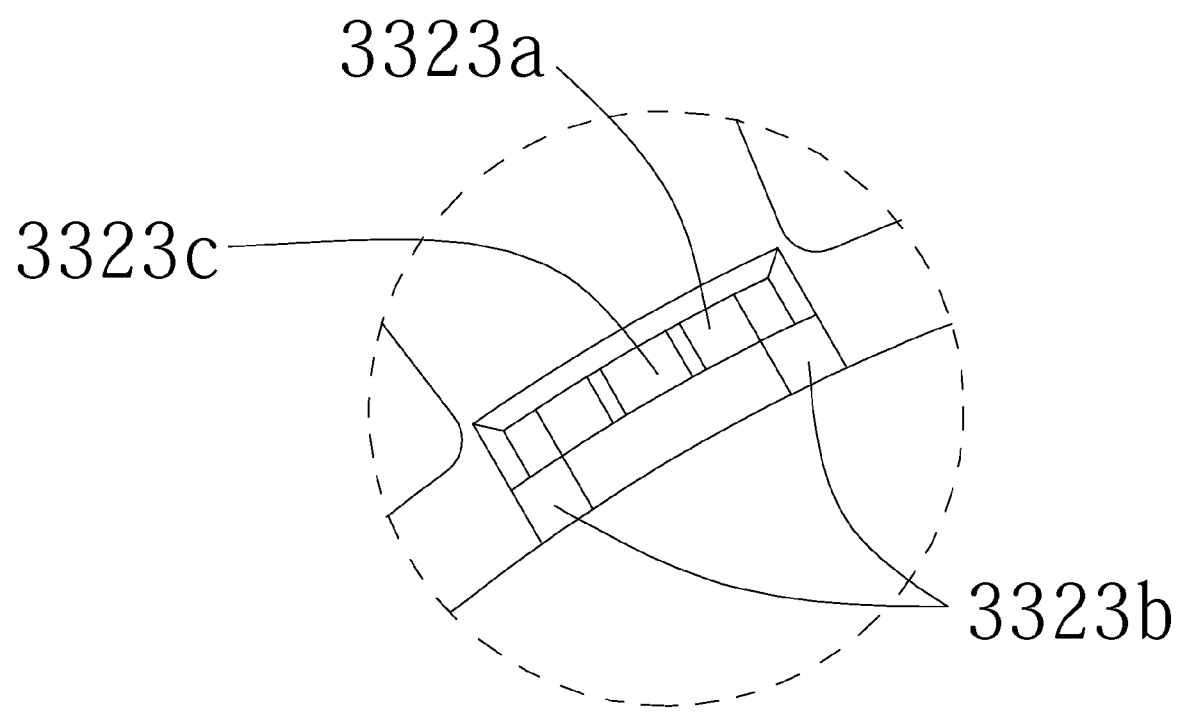

Referring to FIG. 13D which is an enlarged view of portion B2 in FIG. 10, two of the inner conductor supporting portions 3323 that oppose each other by 180 degrees in the circumferential direction are provided with projecting portions 3323c that project axially upward from the upper end surfaces of the peripheral walls 3323a. The projecting portions 3323c are used for locating a first inner spacer 341 which will be described below.

Referring to FIG. 10, a plurality of outer conductor supporting portions 3324 are provided at intervals along the circumferential direction (e.g., eight positions in the present preferred embodiment). The outer conductor supporting portions 3324 are preferably disposed at positions separated from one another by every two teeth 311 in the circumferential direction.

Figure 14A:
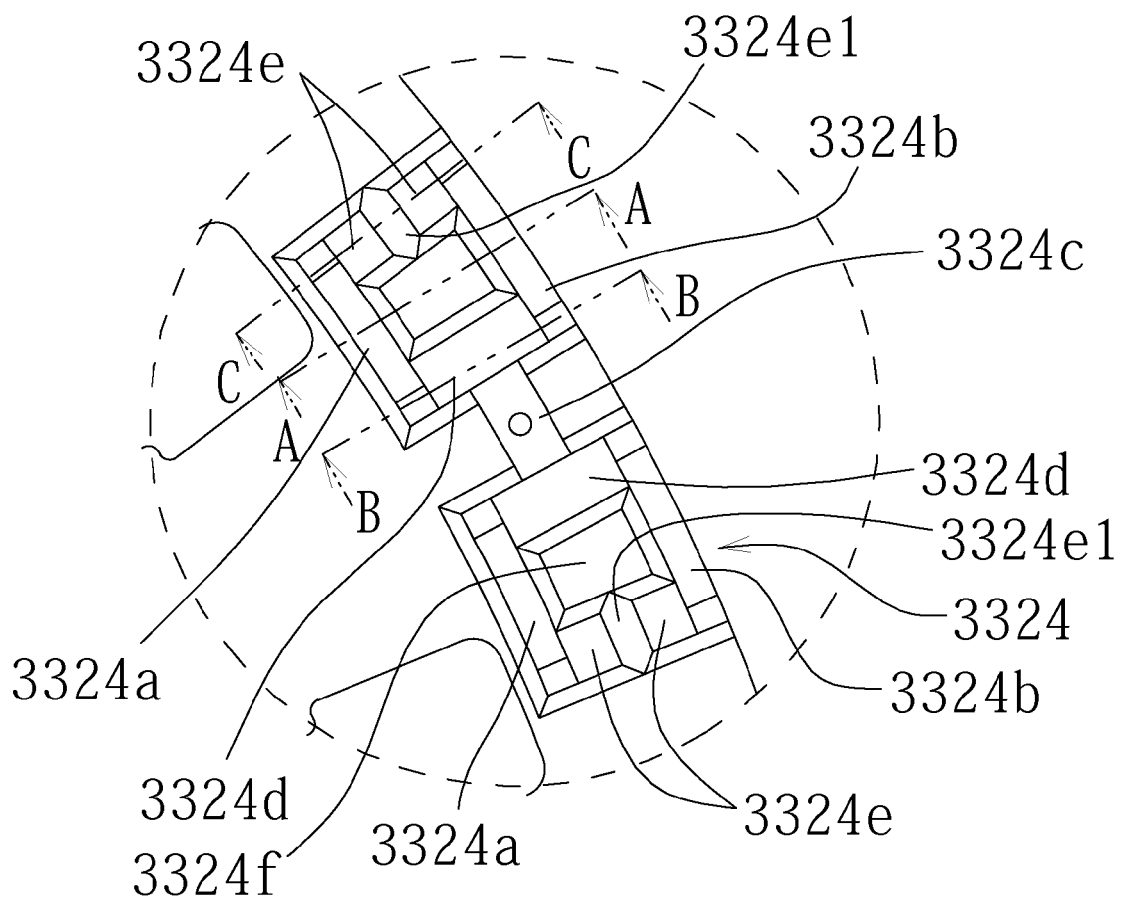
FIGS. 14A to 14D are schematic enlarged views of portions in FIG. 10.
Figure 14B:
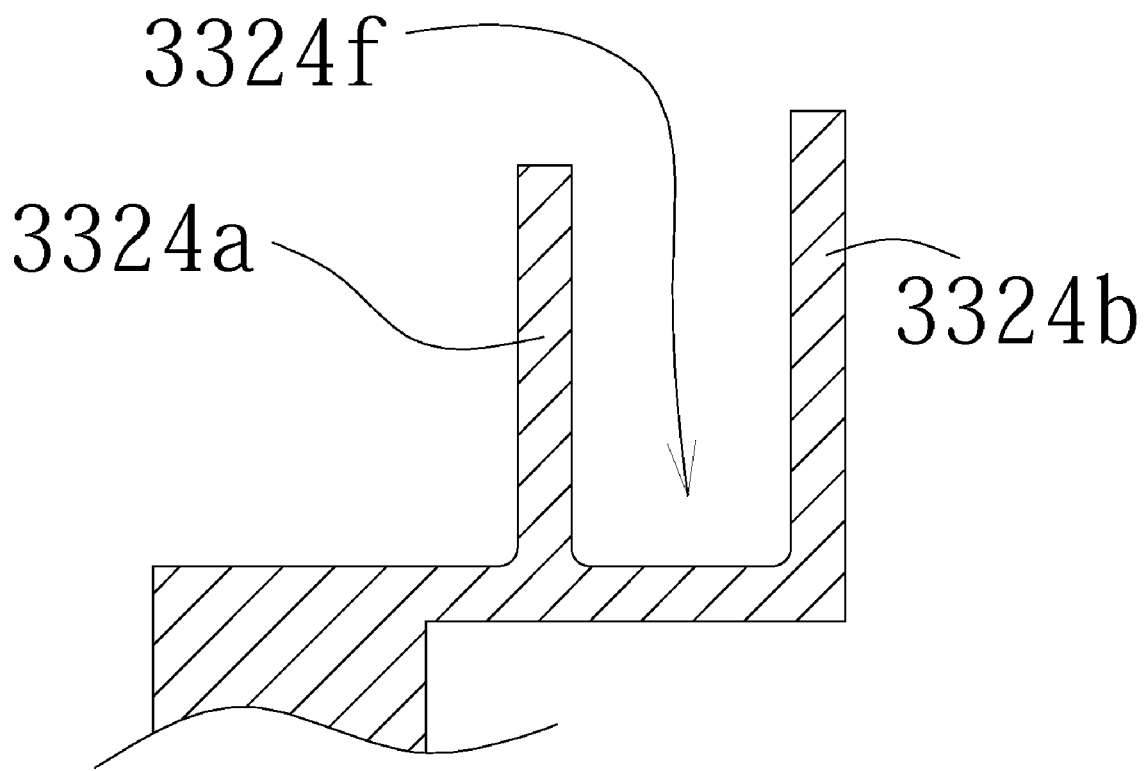
Figure 14C:
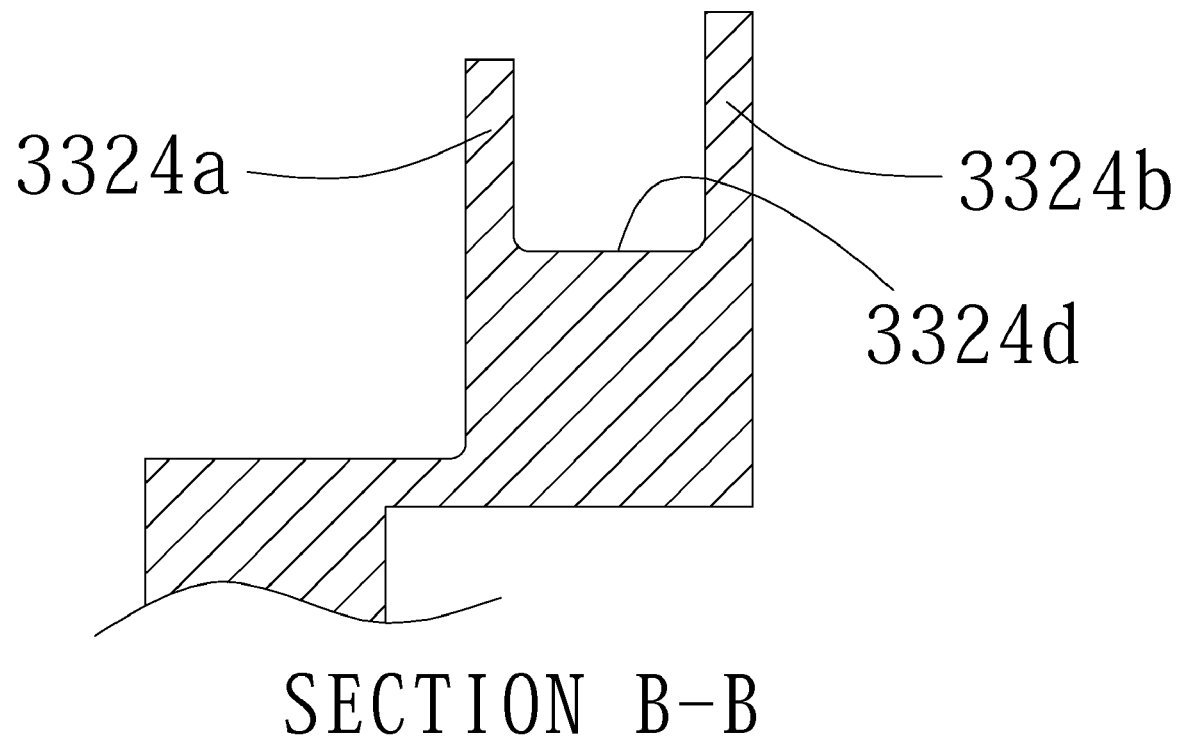
Figure 14D:
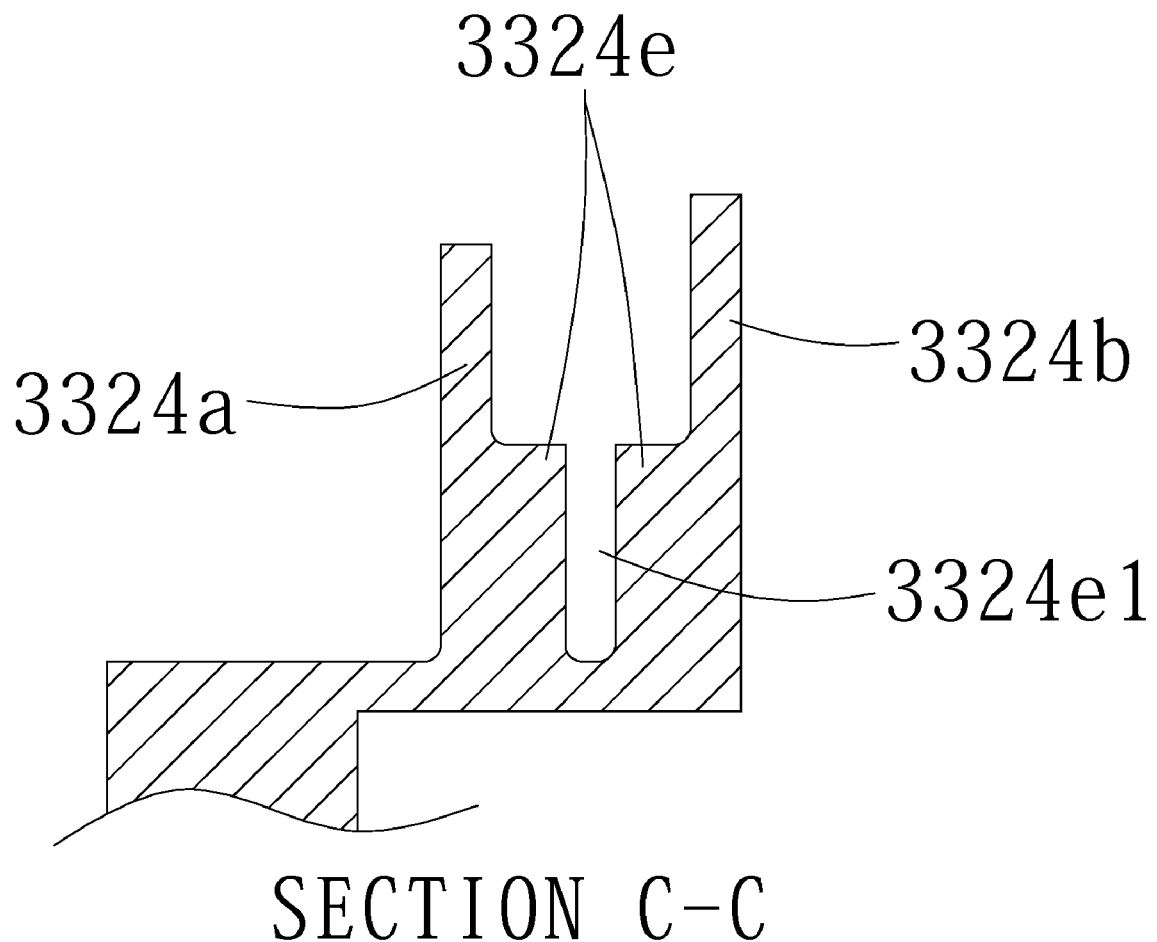

Referring to FIGS. 14A to 14D focusing on each of the eight positions, two outer conductor supporting portions 3324 are provided, slightly spaced apart from each other in the circumferential direction. FIG. 14A is an enlarged view of portion A1 in FIG. 10. Each outer conductor supporting portion 3324 has an inner peripheral wall 3324a and an outer peripheral wall 3324b. The inner peripheral walls 3324a abut against the inner peripheral surface of a connecting portion 3224 (see FIG. 17) of an outer conductor 322, which will be described below. The outer peripheral walls 3324b abut against the outer peripheral surface of the connecting portion 3224. The upper surfaces of the outer peripheral walls 3324b are preferably axially higher than the upper surfaces of the inner peripheral walls 3324a. A gate 3324c is arranged so as to bridge the two outer conductor supporting portions 3324 circumferentially. The gate 3324c is disposed in a radially intermediate portion between the inner peripheral walls 3324a and the outer peripheral walls 3324b.

First protruding portions 3324d supporting a connecting portion 3224 are arranged between the inner peripheral walls 3324a and the outer peripheral walls 3324b along the radial direction such that the first protruding portions 3324d radially connect the inner peripheral walls 3324a and the outer peripheral walls 3324b. Two first protruding portions 3324d are provided, spaced apart from each other circumferentially with the gate 3324c interposed in between. The circumferential width of a first protruding portion 3324d is approximately the same as the radial widths of the inner peripheral wall 3324a and the outer peripheral wall 3324b. The first protruding portions 3324d connect with the gate 3324c. Second protruding portions 3324e are provided at both circumferential ends of the outer conductor supporting portions 3324, respectively, while being spaced apart from the first protruding portions 3324d in the circumferential direction. The second protruding portions 3324e extend between the inner peripheral walls 3324a and the outer peripheral walls 3324b so as to connect them. The upper surfaces of the first protruding portions 3324d are preferably at approximately the same axial height as the upper surfaces of the second protruding portions 3324e. A groove 3324e1 is provided in a radially central portion of each second protruding portion 3324e. Recesses 3324f are provided between the first protruding portions 3324d and the second protruding portions 3324e in the circumferential direction. The second protruding portions 3324e preferably have approximately the same circumferential width as the first protruding portions 3324d. With this structure, resin injected from the gate 3324c is molded approximately uniformly in thickness, so that mold failure can be reduced in the outer conductor supporting portions 3324. The upper surface of the gate 3324c is preferably at approximately the same axial height as the upper surfaces of the first protruding portions 3324d and the second protruding portions 3324e.

Referring to FIG. 15 which is an enlarged view of portion A2 in FIG. 10, two of the outer conductor supporting portions 3324 that are separate from each other by 180 degrees in the circumferential direction are provided with projecting portions 3324a1 that protrude axially upward from the upper surfaces of the inner peripheral walls 3324a. The projecting portions 3324a1 are used for locating a first outer spacer 343 which will be described below. The upper surfaces of the projecting portions 3324a1 are preferably axially lower than the upper surfaces of the outer peripheral walls 3324b.

The conductors 32 include the inner conductors 321 and the outer conductors 322. The inner conductors 321 are inserted into the slots 313 at the inner peripheral side. The outer conductors 322 are inserted into the slots 313 at the outer peripheral side.

Referring to FIG. 16, the inner conductors 321 preferably have a rectangular or substantially rectangular shape in cross-section that has short sides 3211 and long sides 3212. An inner conductor 321 has first bent portions 3213, a connecting portion 3214, and a pair of linear portions 3215. The inner conductor 321 is bent on a long side 3212 to provide the first bent portions 3213. The connecting portion 3214 connects the first bent portions 3213. The linear portions 3215 extend substantially parallel to each other in the axial direction. Provided between the first bent portions 3213 and the linear portions 3215 are second bent portions 3216 that are formed by bending the inner conductor 321 on a short side 3211 so that the connecting portion 3214 will be disposed on the radially inner side when the inner conductor 321 is inserted in the armature core 31. The bent portions are preferably formed through bending by a machine press. The ends of the linear portions 3215 are welded to the connection terminals 41 of the connection terminal table 4.

Referring to FIG. 17, the outer conductors 322 are preferably formed into a rectangular or substantially rectangular shape in cross-section that has short sides 3221 and long sides 3222. The outer conductors 322 preferably have the same linear shape as the inner conductors 321 before being bent. The outer conductor 322 has first bent portions 3223, a connecting portion 3224, and linear portions 3225. The outer conductor 322 is bent on a short side 3221 to provide the first bent portions 3223. The connecting portion 3224 connects the first bent portions 3223. The linear portions 3225 extend substantially parallel to each other in the axial direction. Provided between the first bent portions 3223 and the linear portions 3225 are second bent portions 3226 that are formed by bending the outer conductor 322 on a long side 3222 so that the connecting portion 3224 will be disposed on the radially outer side when the outer conductor 322 is inserted in the armature core 31. The bent portions are preferably formed through bending by a machine press. The ends of the linear portions 3225 are welded to the connection terminals 41 of the connection terminal table 4.

Referring to FIG. 18, the inner conductors 321 and the outer conductors 322 are arranged in the slots 313 such that the long sides 3212 of the inner conductors 321 extend in the radial direction and the short sides 3221 of the outer conductors 322 extend in the radial direction. In each slot 313, preferably two inner conductors 321 and two outer conductors 322 are lined in the radial direction.

The insulating spacers 34, which are different members from the insulator 33, are disposed at predetermined positions in order to hold the conductors 32. Referring to FIGS. 19A to 22C, the insulating spacers 34 include the first inner spacer 341, a second inner spacer 342, the first outer spacer 343, and a second outer spacer 344. The first and second inner spacers 341 and 342 are disposed radially inside the slots 313. The first and second outer spacers 343 and 344 are disposed radially outside the slots 313.

The first inner spacer 341 is disposed such that the center thereof is coincident with the center of a virtual circle defined by linking the inner conductor supporting portions 3323 of the insulator 33 (see FIG. 10). The first inner spacer 341 is held on the inner conductor supporting portions 3323.

The second inner spacer 342 is disposed concentrically with the first inner spacer 341. The second inner spacer 342 is held on the first inner spacer 341.

The first outer spacer 343 is disposed such that the center thereof is coincident with the center of a virtual circle defined by linking the outer conductor supporting portions 3324 of the insulator 33 (see FIG. 10). The first outer spacer 343 is held on the outer conductor supporting portions 3324.

The second outer spacer 344 is disposed concentrically with the first outer spacer 343. The second outer spacer 344 is held on the first outer spacer 343.

Referring to FIGS. 19A to 19C, the first inner spacer 341 is formed from a resin, or any other suitable material, having a good insulating property through injection molding. The first inner spacer 341 has a plurality of (for example, eight in the present preferred embodiment) supporting portions 3411, an annular base 3412, and two locating portions 3413. The supporting portions 3411 are provided at intervals along the circumferential direction. The base 3412 connects the supporting portions 3411 along the circumferential direction. The locating portions 3413 are provided on the base 3412 spaced apart from each other by 180 degrees in the circumferential direction.

Each supporting portion 3411 has a supporting surface 3411a, an inner peripheral wall 3411b, and an outer peripheral wall 3411c. The supporting surfaces 3411a axially support the connecting portions 3214 of the inner conductors 321 (see FIG. 16). The inner and outer peripheral walls 3411b and 3411c radially support the connecting portions 3214. The outer peripheral walls 3411c are provided radially outside the outer peripheral surface of the base 3412. Two of the supporting portions 3411 separate from each other by 180 degrees are provided with, on the upper surfaces of their inner peripheral walls 3411b, projecting portions 3411d to be used for locating the second inner spacer 342. The upper surfaces of the inner peripheral walls 3411b excluding the projecting portions 3411d are preferably disposed at a height axially lower than the upper surfaces of the outer peripheral walls 3411c and at approximately the same axial height as the upper surfaces of the connecting portions 3214 when the connecting portions 3214 are placed on the supporting portions 3411.

The locating portions 3413 are provided on the outer peripheral surface of the base 3412. The locating portions 3413 have two projections respectively to pinch, on the circumferential side surfaces, each of the projecting portions 3323c provided on the inner conductor supporting portions 3323 of the insulator 33 (see FIGS. 10 and 13D). With this structure, the first inner spacer 341 can easily and highly accurately be positioned circumferentially relative to the inner conductor supporting portions 3323.

Referring to FIGS. 20A to 20C, the second inner spacer 342 is preferably formed from a resin, or any other suitable material, having a good insulating property through injection molding. The second inner spacer 342 has a plurality of (for example, eight in the present preferred embodiment) supporting portions 3421, an annular base 3422, and two locating portions 3423. The supporting portions 3421 are provided at intervals along the circumferential direction. The base 3422 connects the supporting portions 3421 along the circumferential direction. The locating portions 3423 are provided on the base 3422 spaced apart from each other by 180 degrees in the circumferential direction.

Each supporting portion 3421 has a supporting surface 3421a, an inner peripheral wall 3421b, and an outer peripheral wall 3421c. The supporting surfaces 3421a axially support the connecting portions 3214 of the inner conductors 321 (see FIG. 16). The inner and outer peripheral walls 3421b and 3421c radially support the connecting portions 3214. The supporting portions 3421 are disposed such that the radial positions thereof extend radially outside the radial positions of the supporting portions 3411 of the first inner spacer 341.

The locating portions 3423 are provided on the outer peripheral surface of the base 3422. The locating portions 3423 have two projections respectively to pinch, on the circumferential side surfaces, each of the projecting portions 3411d of the first inner spacer 341. With this structure, the second inner spacer 342 can easily and highly accurately be positioned circumferentially relative to the first inner spacer 341.

Referring to FIGS. 21A to 21C, the first outer spacer 343 is preferably formed from a resin, or any other suitable material, having a good insulating property through injection molding. The first outer spacer 343 has a plurality of (eight in the present preferred embodiment) supporting portions 3431, an annular base 3432, and two locating portions 3433. The supporting portions 3431 are provided at intervals along the circumferential direction. The base 3432 connects the supporting portions 3431 along the circumferential direction. The locating portions 3433 are provided on the base 3432 spaced apart from each other by 180 degrees in the circumferential direction.

Each supporting portion 3431 has a supporting surface 3431a and an inner peripheral wall 3431b. The supporting surfaces 3431a axially support the connecting portions 3224 of the outer conductors 322. The inner peripheral walls 3431b radially support the connecting portions 3224. The supporting surfaces 3431a are provided in the same plane as the base 3432. The supporting surfaces 3431a extend radially inward from the inner peripheral surface of the base 3432. Two of the inner peripheral walls 3431b that are separate from each other by 180 degrees in the circumferential direction are provided on their upper surfaces with projecting portions 3431d that project axially.

The locating portions 3433 are provided on the inner peripheral surface of the base 3432. The locating portions 3433 have two projections respectively to pinch, on the circumferential side surfaces, each of the projecting portions 3324a1 of the outer conductor supporting portions 3324. With this structure, the first outer spacer 343 can easily and highly accurately be positioned circumferentially relative to the outer conductor supporting portions 3324.

Referring to FIGS. 22A to 22C, the second outer spacer 344 is preferably formed from a resin, or any other suitable material, having a good insulating property through injection molding. The second outer spacer 344 has a plurality of (for example, eight in the present preferred embodiment) supporting portions 3441, an annular base 3442, and two locating portions 3443. The supporting portions 3441 are provided at intervals along the circumferential direction. The base 3442 connects the supporting portions 3441 along the circumferential direction. The locating portions 3443 are provided on the base 3442 spaced apart from each other by 180 degrees in the circumferential direction.

Each supporting portion 3441 has a supporting surface 3441a, an inner peripheral wall 3441b, and an outer peripheral wall 3441c. The supporting surfaces 3441a axially support the connecting portions 3224 of the outer conductors 322. The inner and outer peripheral walls 3441b and 3441c radially support the connecting portions 3224. The supporting surfaces 3441a are provided in the same plane as the base 3442. The supporting surfaces 3441a extend radially inward from the inner peripheral surface of the base 3442.

The locating portions 3443 are provided on the inner peripheral surface of the base 3442. The locating portions 3443 have two projections respectively to pinch, on the circumferential side surfaces, each of the projecting portions 3431d of the first outer spacer 343. With this structure, the second outer spacer 344 can easily and highly accurately be positioned circumferentially relative to the first outer spacer 343.

Referring to FIG. 23, each of the three outer conductors 322 are arranged in the circumferential direction in an overlapping manner such that the connecting portions 3224 thereof are circumferentially offset relative to one another by two teeth 311, and that the circumferentially adjacent outer conductors 322 are inserted into the slots 313 each offset by one. The connecting portions 3224 of the outer conductors 322 are preferably set at three different axial heights.

With this structure, the connecting portions 3224 of the outer conductors 322 are disposed at separate positions from one another, whereby enhanced heat dissipation can be achieved with the outer conductors 322. Further, although the connecting portions 3224 are spaced apart from one another, the insulating spacers 34 hold the connecting portions 3224 thereby ensuring insulation between the connecting portions 3224.

Method of Manufacturing the Armature as the Stator

Figure 24:
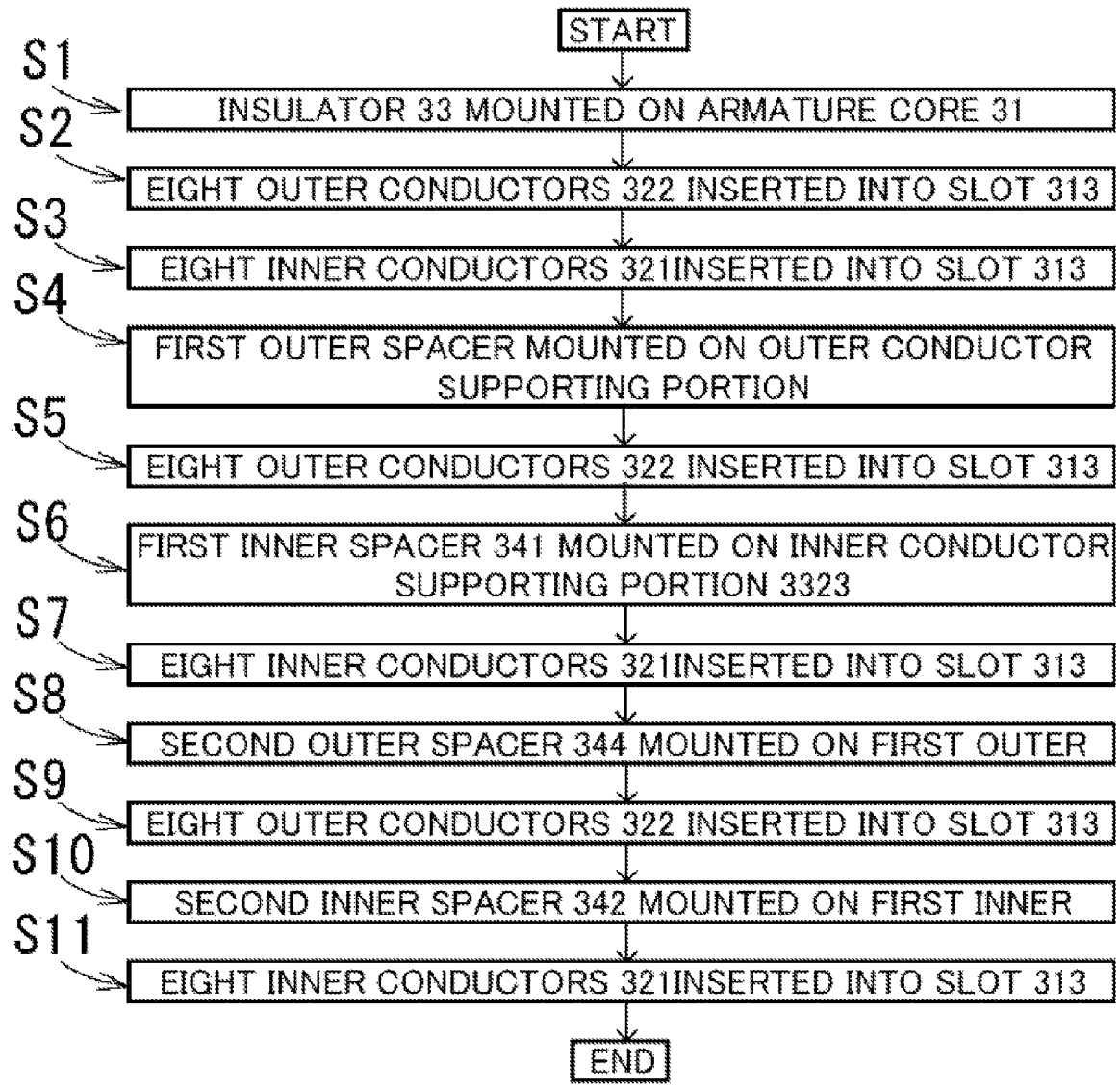
FIG. 24 is a schematic flowchart showing a process of manufacturing the armature.

A method of manufacturing the armature 3 according to a preferred embodiment of the present invention will be described below with reference to FIGS. 24 to 34. FIG. 24 is a flowchart showing a process of manufacturing the armature 3. FIGS. 25 to 34 are plan views of the armature 3 when viewed from below in the axial direction, each view sequentially illustrating a corresponding state in the flowchart. FIG. 35 is a flowchart showing a process of manufacturing the motor 1.

First, the insulator 33 is mounted on the armature core 31 (Step S1 in FIG. 24). Since the upper insulator 331 and the lower insulator 332 are integrally molded with the slot insulators 3312 and 3322 and the lids 3311 and 3321, respectively, a step of inserting the slot insulators 3312 and 3322 into each one of the slots 313 of the armature core 31 can be eliminated as compared with the case in which the slot insulators 3312 and 3322 are provided independently of the lids 3311 and 3321. Thus, the manufacture of the stator (armature) 3 can be facilitated so that the production efficiency can be improved. Additionally, the upper and lower insulators 331 and 332 can be located axially by bringing the lids 3311 and 3321 into contact with each of the end surfaces of the armature core 31. Therefore, the slot insulators 3312 and 3322 can easily be located axially.

Figure 25:
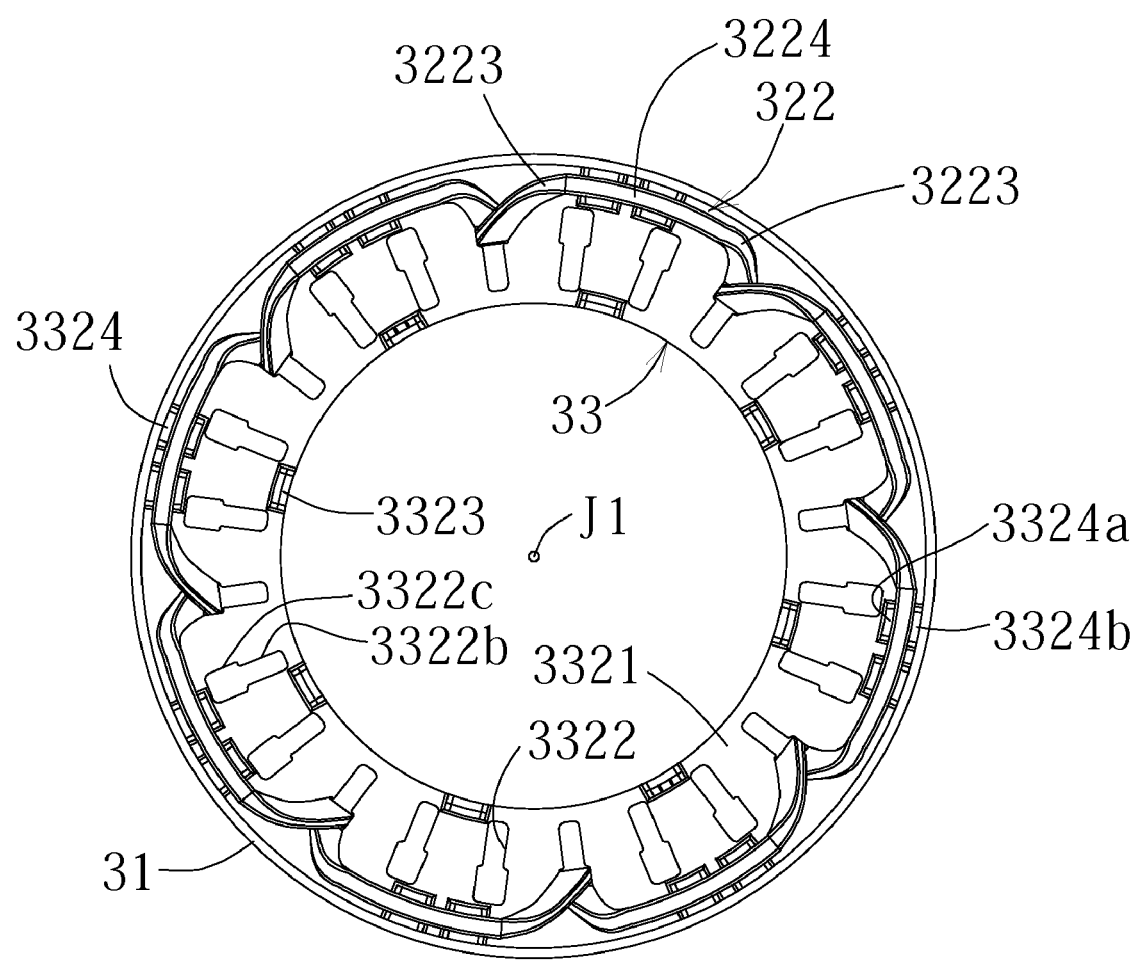
FIGS. 25 to 34 are schematic plan views of the armature when viewed from below in the axial direction, each view sequentially illustrating a corresponding state in the flowchart.

Next, eight outer conductors 322, which are formed into an approximate U-shape in advance, are inserted from the side of the slot insulators 3322 of the lower insulator 332 through the lid 3321 (Step S2 in FIG. 24; see also FIG. 25). The outer conductors 322 are inserted into the enlarged width portions 3322c of the slot insulators 3322 so that the long sides 3222 become approximately perpendicular to the radial direction. That is, one of the two linear portions 3225 of each outer conductor 322 is inserted at the radially inner side, and the other linear portion 3225 at the radially outer side, in each enlarged width portion 3322c. The outer conductors 322 are inserted until the connecting portions 3224 thereof touch the inner peripheral walls 3324a of the outer conductor supporting portions 3324 of the lower insulator 332. In this manner, the outer conductors 322 can easily be located axially. Each connecting portion 3224 is disposed between the inner peripheral wall 3324a and the outer peripheral wall 3324b of an outer conductor supporting portion 3324. Since the radial distance between an inner peripheral wall 3324a and an outer peripheral wall 3324b is approximately the same as the radial width of a connecting portion 3224, the connecting portions 3224 can easily be located radially by disposing the connecting portions 3224 within the radial gaps between the inner peripheral walls 3324a and the outer peripheral walls 3324b.

In addition, the circumferential length of a connecting portion 3224 is longer than the circumferential widths of the corresponding inner peripheral walls 3324a. This structure keeps the first bent portions 3223 from contacting the outer conductor supporting portions 3324. It is therefore possible to eliminate a loose fit of the outer conductors 322 due to contact of the first bent portions 3223 on the outer conductor supporting portions 3324.

Figure 26:
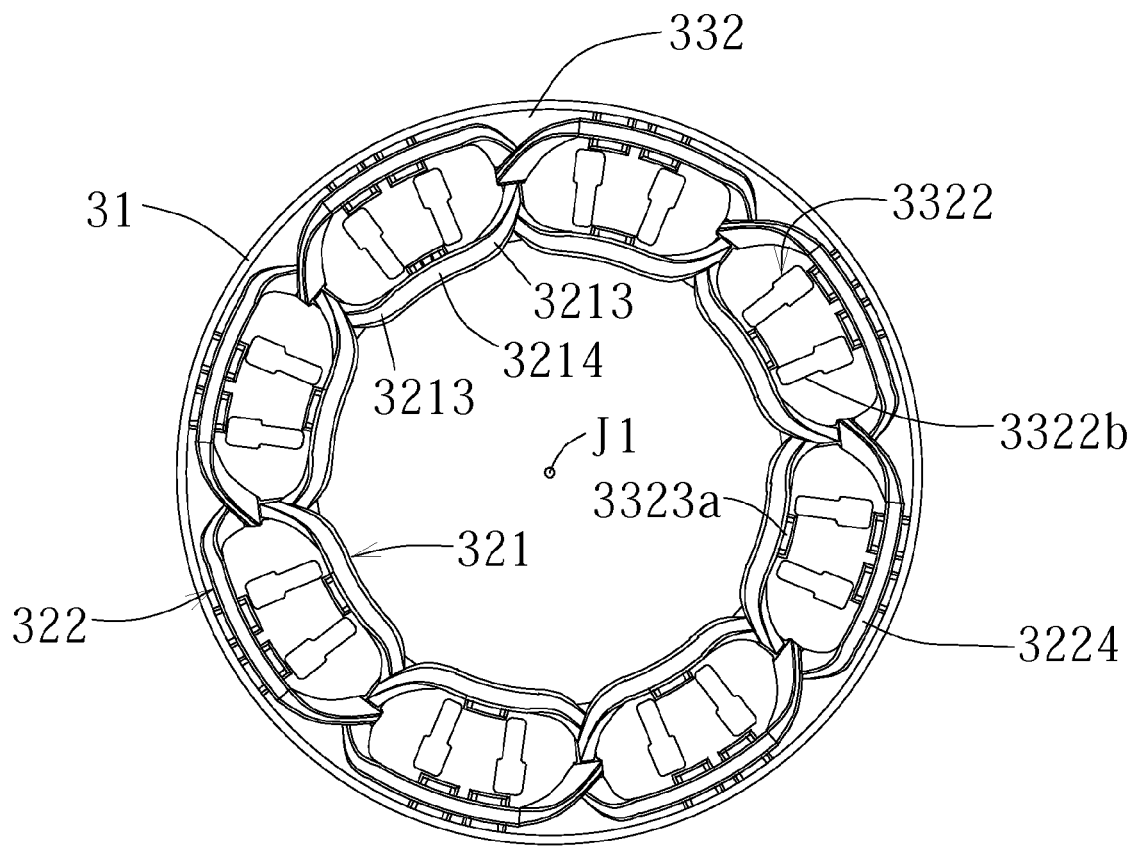

Then, preferably eight, for example, inner conductors 321, which are formed into an approximate U-shape in advance, are inserted from the side of the slot insulators 3322 of the lower insulator 332 through the lid 3321 (Step S3 in FIG. 24; see also FIG. 26). The inner conductors 321 are inserted into the narrow width portions 3322b of the slot insulators 3322 so that the long sides 3212 become approximately parallel to the radial direction. That is, one of the two linear portions 3215 of each inner conductor 321 is inserted at the radially inner side, and the other linear portion 3215 at the radially outer side, in each narrow width portion 3322b. The inner conductors 321 are inserted until the connecting portions 3214 thereof touch the upper surfaces of the projecting portions 3323b on the inner conductor supporting portions 3323 in the lower insulator 332. In this manner, the inner conductors 321 can easily be located axially. The connecting portions 3214 meet the inner peripheral surfaces of the peripheral walls 3323a. Thus, the inner conductors 321 can easily be located radially.

The circumferential length of a connecting portion 3214 is longer than the circumferential width of the corresponding peripheral wall 3323a. This structure keeps the first bent portions 3213 from contacting the inner conductor supporting portions 3323. It is therefore possible to eliminate a loose fit of the inner conductors 321 due to contact of the first bent portions 3213 on the inner conductor supporting portions 3323.

Figure 27:
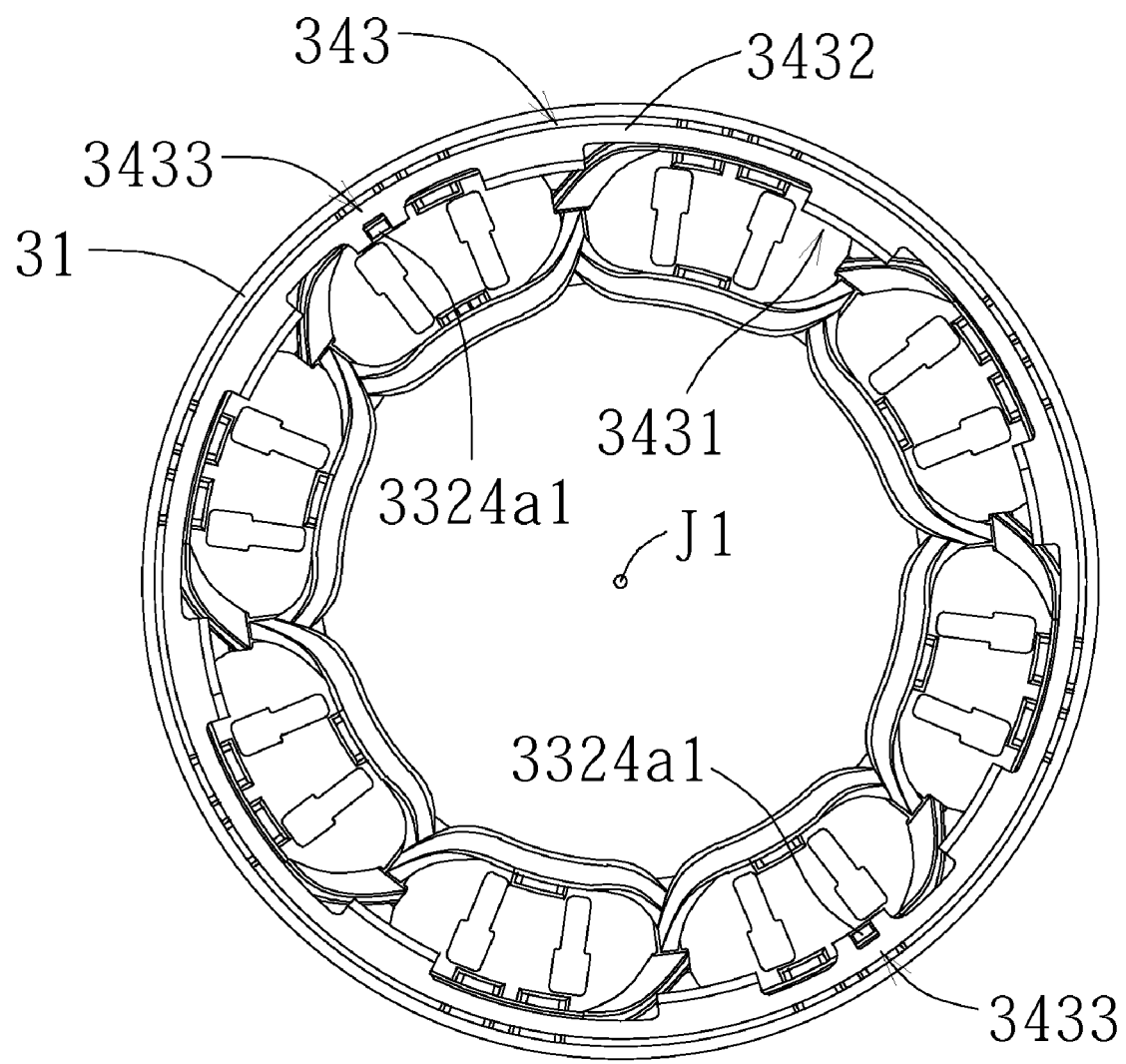

Next, the first outer spacer 343 is mounted such that the projecting portions 3324a1 of the outer conductor supporting portions 3324 are locked in the locating portions 3433 (Step S4 in FIG. 24; see also FIG. 27). The lower surfaces of the locating portions 3433 of the first outer spacer 343 meet the upper surfaces of the inner peripheral walls 3324a of the outer conductor supporting portions 3324, so that the first outer spacer 343 can easily be located axially. Additionally, the locating portions 3433 enable the first outer spacer 343 to be easily located circumferentially and radially relative to the outer conductor supporting portions 3324. The lower surface of the base 3432 of the first outer spacer 343 is disposed in close axial proximity to the upper surfaces of the connecting portions 3224 of the outer conductors 322 (i.e., the surfaces included in the connecting portions 3224 and axially opposing the lower surface of the base 3432). The circumferential length of a connecting portion 3224 is longer than the circumferential width of the corresponding supporting portion 3431 of the first outer spacer 343. This structure keeps the first bent portions 3223 from contacting the supporting portions 3431.

Figure 28:
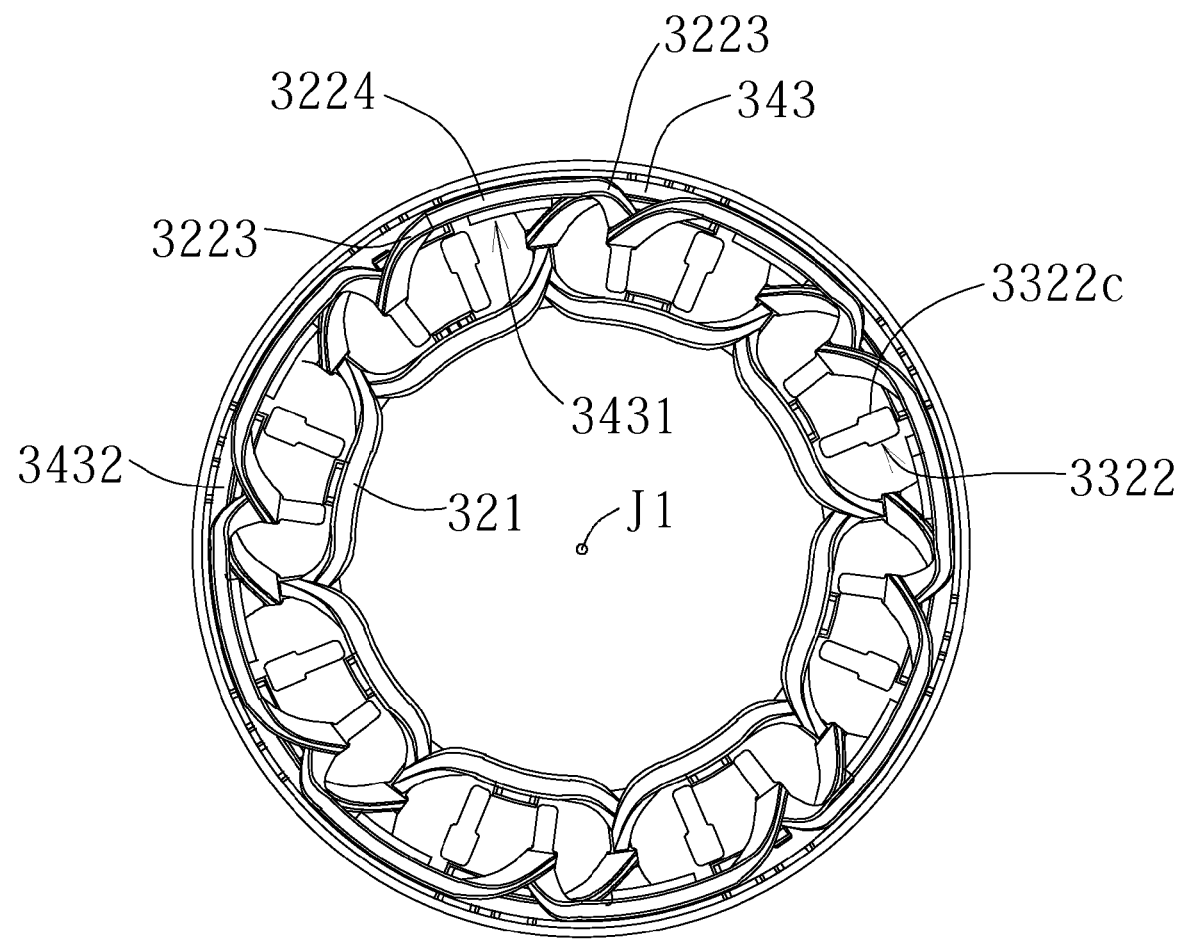

Then, preferably eight, for example, outer conductors 322, which are formed into an approximate U-shape in advance, are inserted from the side of the slot insulators 3322 of the lower insulator 332 through the lid 3321 (Step S5 in FIG. 24; see also FIG. 28). The outer conductors 322 are inserted into the slots 313 that are circumferentially offset by one of the slots 313 into which the outer conductors 322 have been inserted in Step S2 in FIG. 24 so that one of the linear portions 3225 of each outer conductor 322 and that of each previously inserted outer conductor 322 are crossed. The outer conductors 322 are inserted into the enlarged width portions 3322c of the slot insulators 3322 such that the long sides 3222 become approximately perpendicular to the radial direction. That is, one of the two linear portions 3225 of each outer conductor 322 is inserted at the radially inner side, and the other linear portion 3225 at the radially outer side, in each enlarged width portion 3322c. The outer conductors 322 are inserted until the connecting portions 3224 thereof touch the supporting surfaces 3431a of the supporting portions 3431. In this manner, the outer conductors 322 can easily be located axially relative to the armature core 31.

Figure 29:
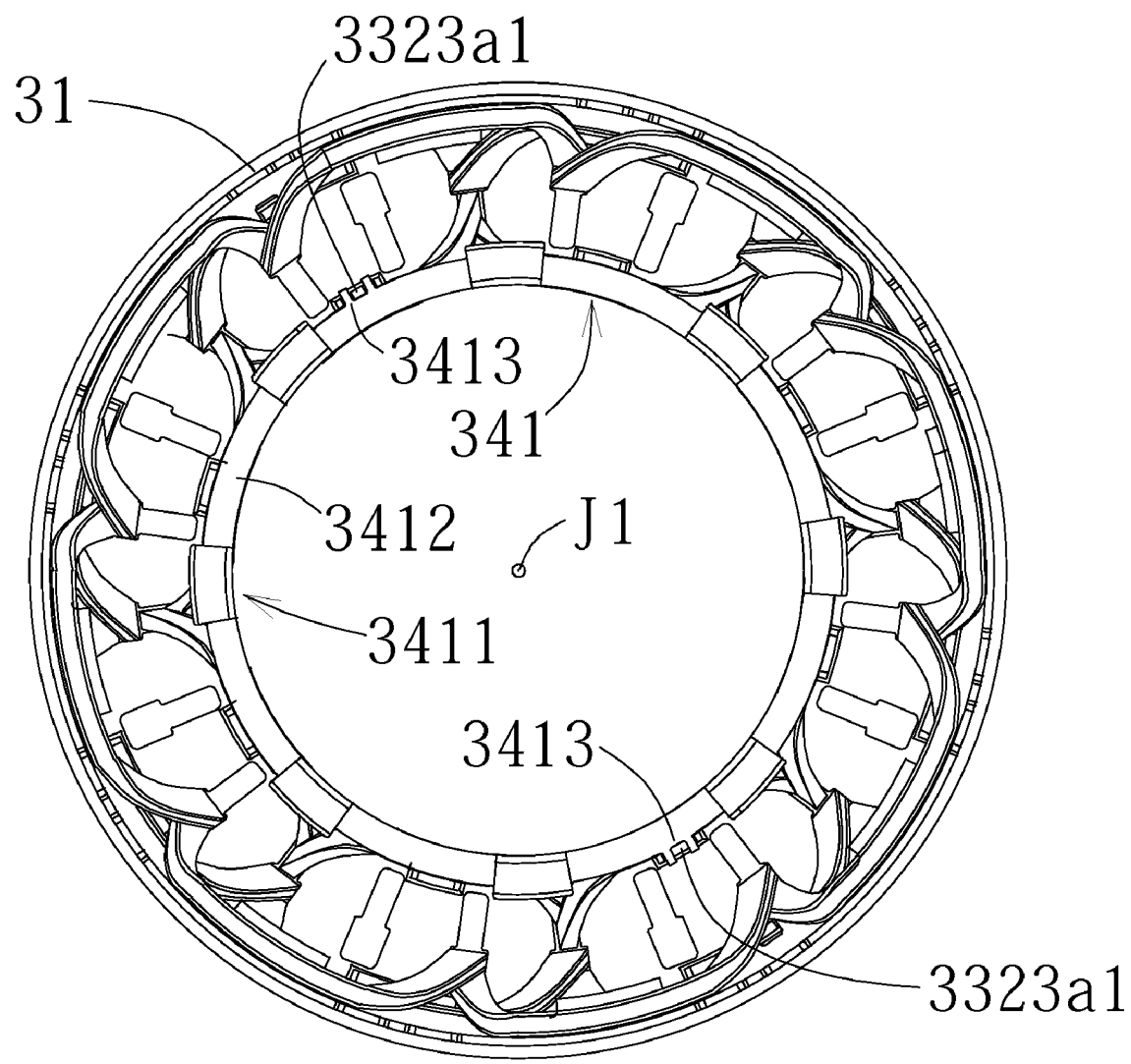

Next, the first inner spacer 341 is mounted such that the projecting portions 3323c of the inner conductor supporting portions 3323 are locked in the locating portions 3413 (Step S6 in FIG. 24; see also FIG. 29). The lower surfaces of the locating portions 3413 meet the upper surfaces of the peripheral walls 3323a of the inner conductor supporting portions 3323 so that the first inner spacer 341 can easily be located axially relative to the inner conductor supporting portions 3323. Additionally, the locating portions 3413 enable the first inner spacer 341 to be easily located circumferentially relative to the inner conductor supporting portions 3323. The base 3412 of the first inner spacer 341 is disposed to extend radially inside the insertion positions of the inner conductors 321 in the narrow width portions 3322b.

Figure 30:
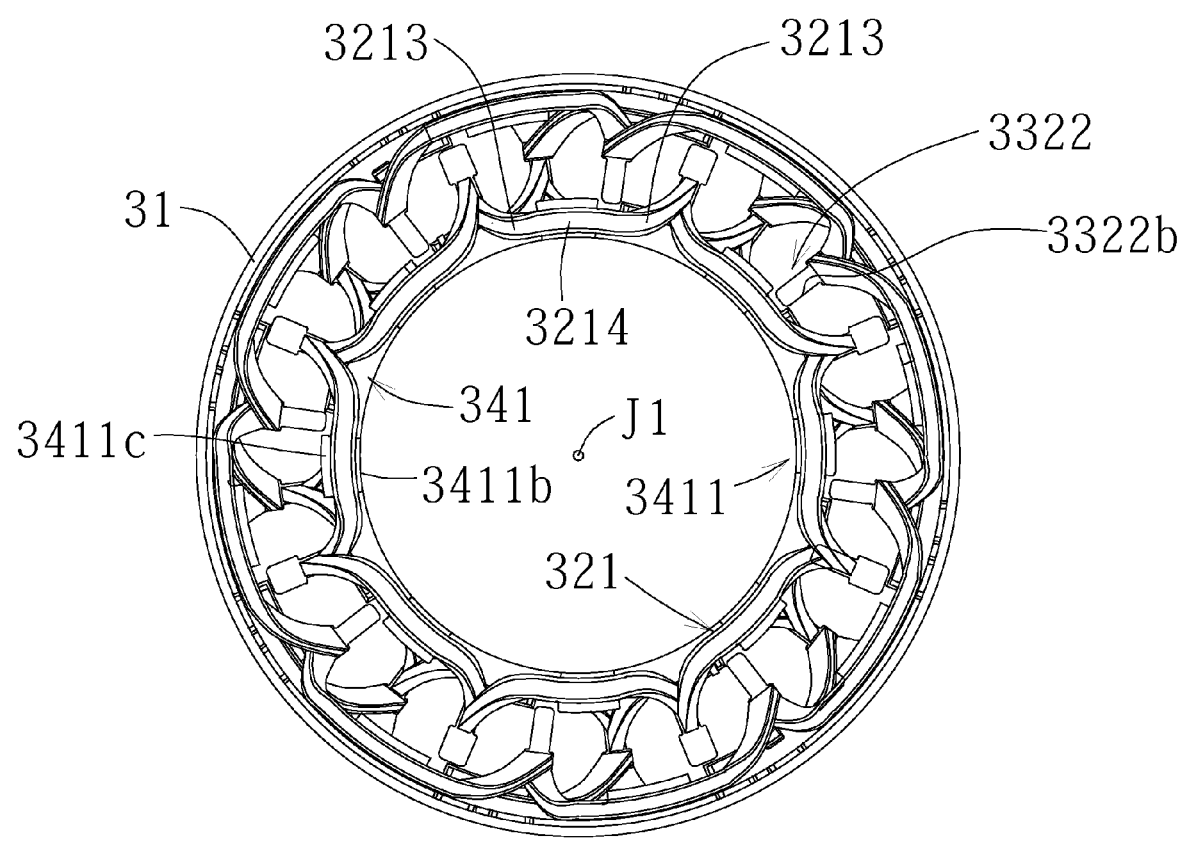

Then, the inner conductors 321, which are formed into an approximate U-shape in advance, are inserted from the side of the slot insulators 3322 of the lower insulator 332 through the lid 3321 (Step S7 in FIG. 24; see also FIG. 30). The inner conductors 321 are inserted into the slots 313 that are circumferentially offset by one of the slots 313 into which the inner conductors 321 have been inserted in Step S3 in FIG. 24 so that one of the linear portions 3215 of each inner conductor 321 and that of each previously inserted inner conductor 321 are crossed. The inner conductors 321 are inserted in the narrow width portions 3322b of the slot insulators 3322 such that the long sides 3212 become approximately parallel to the radial direction. That is, one of the two linear portions 3215 of each inner conductor 321 is inserted at the radially inner side, and the other linear portion 3215 at the radially outer side, in each narrow width portion 3322b.

Figure 31:
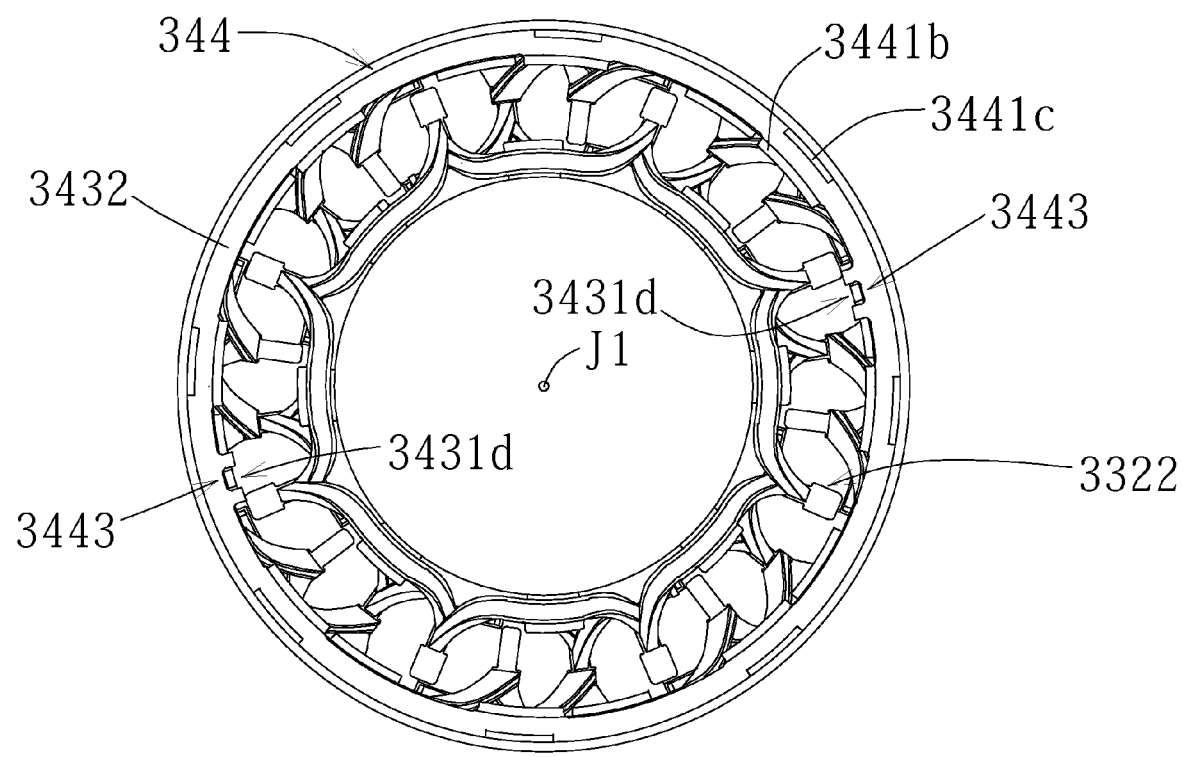

Next, the second outer spacer 344 is mounted such that the projecting portions 3431d of the first outer spacer 343 are locked in the locating portions 3443 (Step S8 in FIG. 24; see also FIG. 31). The lower surfaces of the locating portions 3443 meet the upper surfaces of the inner peripheral walls 3431b of the first outer spacer 343, so that the second outer spacer 344 can easily be located axially relative to the first outer spacer 343. Both the outer peripheral surfaces of the respective bases 3432 and 3442 of the first outer spacer 343 and the second outer spacer 344 are disposed to extend radially outside the outer peripheral surfaces of the connecting portions 3224. The axial distance between the upper surface of the base 3432 of the first outer spacer 343 and the lower surface of the base 3442 of the second outer spacer 344 becomes approximately the same as the axial thickness of a connecting portion 3224. This structure restricts axial movement of the connecting portions 3224.

Figure 32:
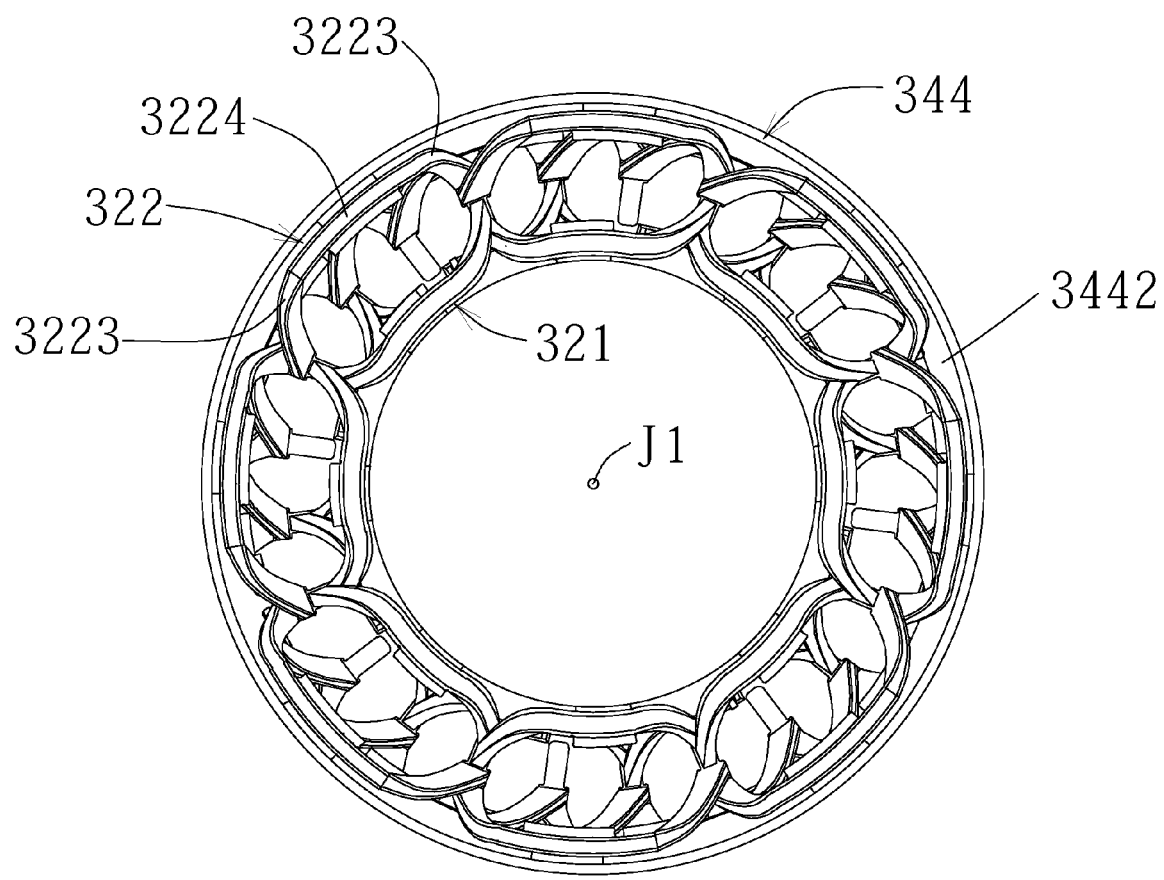

Then, preferably eight, for example, outer conductors 322, which are formed into an approximate U-shape in advance, are inserted from the side of the slot insulators 3322 of the lower insulator 332 through the lid 3321 (Step S9 in FIG. 24; see also FIG. 32). The outer conductors 322 are inserted into the slots 313 that are circumferentially offset by one of the slots 313 into which the outer conductors 322 have been inserted in Step S5 in FIG. 24 so that one of the linear portions 3225 of each outer conductor 322 and that of each previously inserted outer conductor 322 are crossed. The outer conductors 322 are inserted into the enlarged width portions 3322c of the slot insulators 3322 such that the long sides 3222 become approximately perpendicular to the radial direction. That is, the outer conductors 322 are arranged in combination with one of the two linear portions 3225 of each outer conductor 322 inserted at the radially inner side and the other linear portion 3225 at the radially outer side, in each enlarged width portion 3322c. The outer conductors 322 are inserted until the connecting portions 3224 thereof touch the supporting surfaces 3441a of the second outer spacer 344. In this manner, the outer conductors 322 can easily be located axially relative to the armature core 31.

Figure 33:
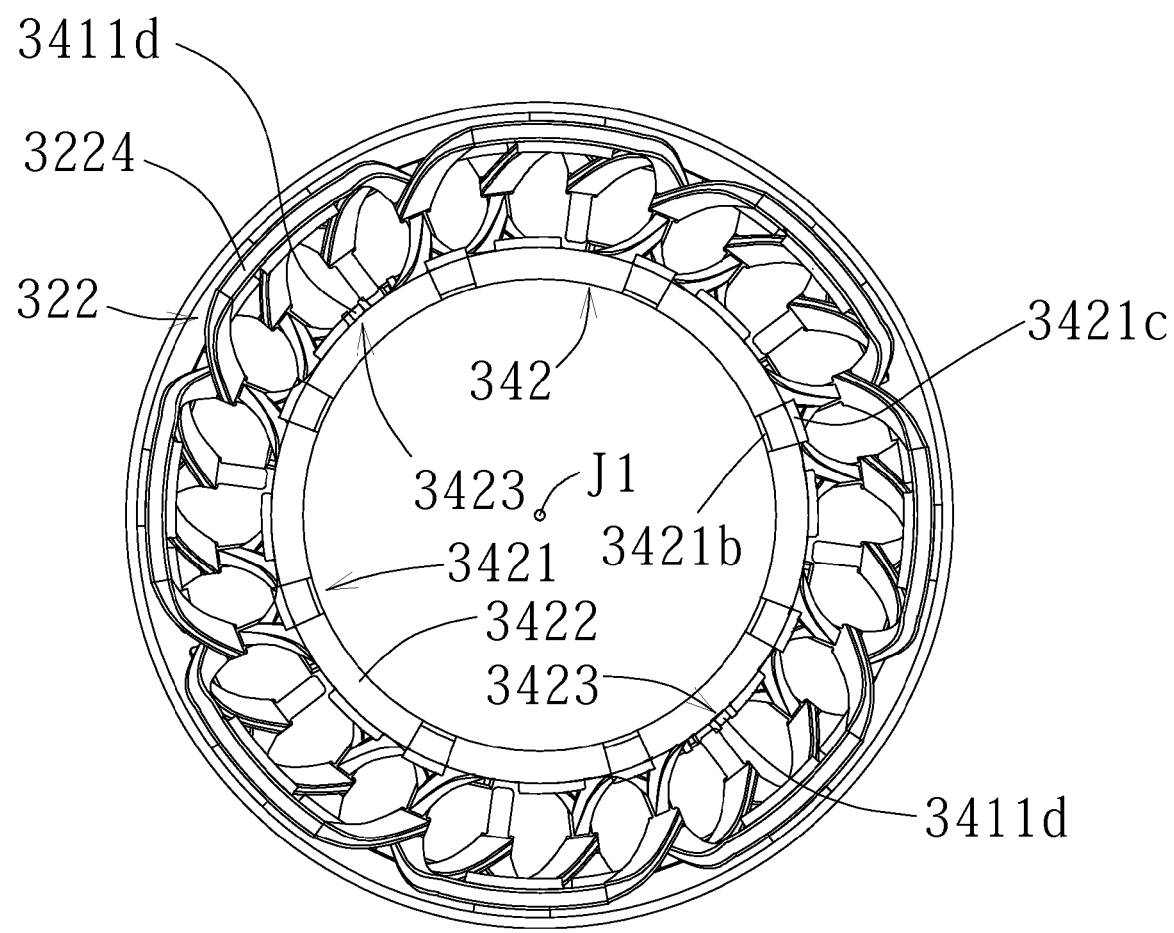

Next, the second inner spacer 342 is mounted such that the projecting portions 3411d of the first inner spacer 341 is locked in the locating portions 3423 (Step S10 in FIG. 24; see also FIG. 33). The lower surfaces of the locating portions 3423 of the second inner spacer 342 meet the upper surfaces of the inner peripheral walls 3411b of the first inner spacer 341, whereby the second inner spacer 342 can easily be located axially relative to the first inner spacer 341.

Figure 34:
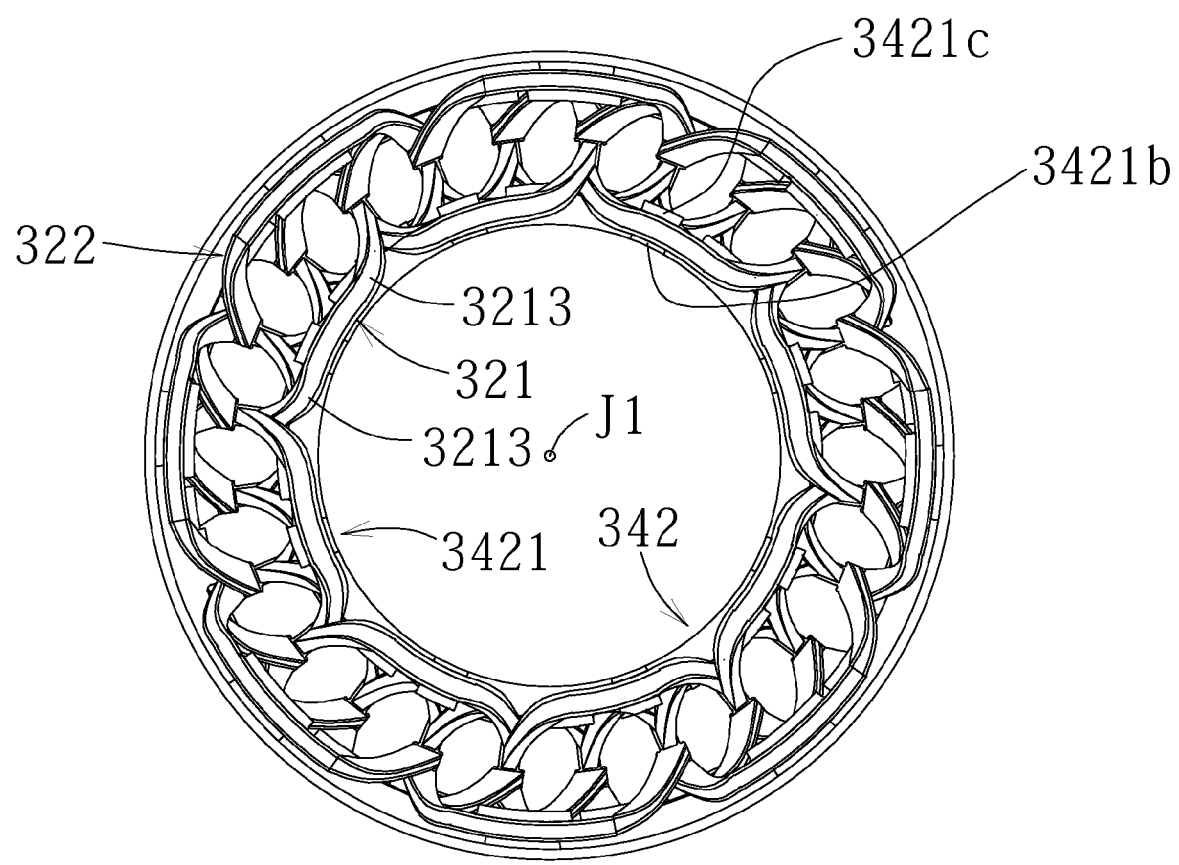
Figure 35:
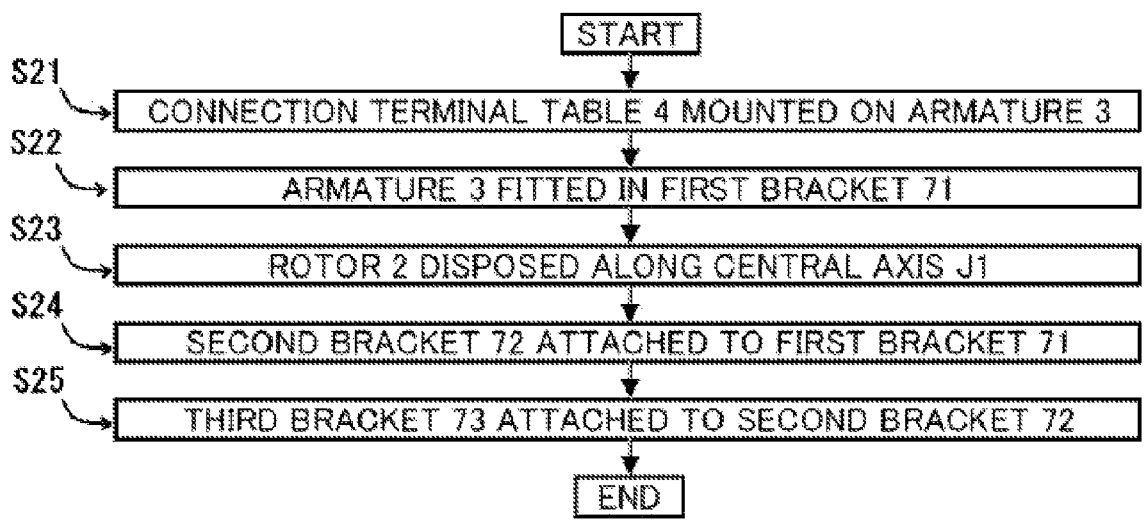
FIG. 35 is a schematic flowchart showing a process of manufacturing the motor.

Then, eight inner conductors 321, which are formed into an approximate U-shape in advance, are inserted from the side of the slot insulators 3322 of the lower insulator 332 through the lid 3321 (Step S11 in FIG. 24; see also FIG. 34). The inner conductors 321 are inserted into the slots 313 that are circumferentially offset by one of the slots 313 into which the inner conductors 321 have been inserted in Step S7 in FIG. 24 so that one of the linear portions 3215 of each inner conductor 321 and that of each previously inserted inner conductor 321 are crossed. The inner conductors 321 are inserted into the narrow width portions 3322b of the slot insulators 3322 such that the long sides 3212 become approximately parallel to the radial direction. That is, one of the two linear portions 3215 of each inner conductor 321 is inserted at the radially inner side, and the other linear portion 3215 at the radially outer side, in each narrow width portion 3322b. The inner conductors 321 are inserted until the connecting portions 3214 thereof touch the supporting surfaces 3421a of the second inner spacer 342. In this manner, the inner conductors 321 can easily be located axially relative to the armature core 31.

Method of Manufacturing the Motor

A method of manufacturing the motor according to a preferred embodiment of the present invention will be described with reference to FIG. 35. FIG. 35 is a flowchart showing a process of manufacturing the motor.

First, the armature 3 manufactured as shown in FIG. 24 is mounted with the connection terminal table 4 (Step S21 in FIG. 35). The terminals of the connection terminal table 4 are preferably connected through welding to the ends of the inner conductors 321 and the outer conductors 322.

Next, the armature 3 is fitted in the first bracket 71 (Step S22 in FIG. 35). The lower ball bearing 61 serving as the bearing mechanism 6 is attached to the first bracket 71 beforehand.

Then, the rotor 2 is disposed along the central axis J1 (Step S23 in FIG. 35). The shaft 21 is fitted to the lower ball bearing 61. In this state, the outer peripheral surfaces of the rotor magnets 23 radially oppose the inner peripheral surface of the teeth 311. The resolver rotor 51 serving as the sensor 5 is fixed to the shaft 21.

Next, the second bracket 72 is attached to the first bracket 71 (Step S24 in FIG. 35). The upper ball bearing 62 and the resolver armature 52 of the sensor 5 are fixed to the second bracket 72 beforehand. Then, the third bracket 73 is attached to the second bracket 72 (Step S25 in FIG. 35), whereby the armature 3, the sensor 5, and the rotor core 22 and the rotor magnets 23 of the rotor 2 are sealed.

While preferred embodiments of the present invention have been described above, it is to be understood that variations and modifications will be apparent to those skilled in the art without departing the scope and spirit of the present invention. The scope of the present invention, therefore, is to be determined solely by the following claims.

For example, according to a preferred embodiment of the present invention, while both the inner and outer conductors 321 and 322 of the conductors 32 preferably have the same shape, the present invention is not limited thereto. The inner and outer conductors 321 and 322 may have different shapes. Also, while both the inner and outer conductors 321 and 322 preferably are rectangular or substantially rectangular wires having short and long sides, the present invention is not limited thereto. At least one of the inner conductors 321 and the outer conductors 322 may be circular wires, for example.

Moreover, according to a preferred embodiment of the present invention, for example, the inner and outer conductor supporting portions 3323 and 3324 of the lower insulator 332 preferably are integrally molded with the lid 3321; however, the present invention is not limited thereto. The inner and outer conductor supporting portions 3323 and 3324 may be formed as separate members from the lid 3321, for example.

What is claimed is:

1. A manufacturing method of a motor having an armature arranged concentrically with a central axis of the motor, the method comprising the steps of:
    a) arranging an insulating spacer at a first axial end of an armature core of the armature, wherein the armature includes the armature core including a plurality of teeth each extending substantially perpendicularly to the central axis and spaced evenly apart from one another in a circumferential direction, a core back having a substantially annular shape connecting the teeth, and a plurality of slots each defined by an inner peripheral surface of the core back and a pair of opposing surfaces of adjacent teeth; a plurality of substantially U-shaped conductors including a pair of linear portions substantially parallel with one another and inserted into corresponding ones of the plurality of slots; and a connecting portion covering an end surface of the armature core and connecting corresponding linear portions; wherein the insulating spacer is arranged at the first axial end of the armature core and includes a conductor supporting portion arranged to support the connecting portion;
    b) inserting the plurality of U-shaped conductors into corresponding ones of the plurality of slots;
    c) arranging the connecting portions of the plurality of substantially U-shaped conductors at the conductor supporting portion of the insulating spacer;
    d) bending a connecting portion of an inner one of the substantially U-shaped conductors radially inward of the linear portions of the inner one of the substantially U-shaped conductors; and
    e) bending a connecting portion of an outer one of the substantially U-shaped conductors radially outward of the linear portions of the outer one of the substantially U-shaped conductors; wherein
    the insulating spacer includes an inner spacer arranged radially inwardly of the teeth, and an outer spacer arranged radially outwardly of the inner spacer;
    the plurality of substantially U-shaped conductors are arranged at the conductor supporting portion of the inner spacer and the conductor supporting portion of the outer spacer; and
    step d) and step e) are carried out prior to step b).

2. The manufacturing method of the motor according to claim 1, further comprising the step of:
    f) inserting a slot insulator into the slot; wherein
    the armature further includes the slot insulator arranged to cover an inner surface of the slot, and
    step f) is carried out prior to step b).

3. A manufacturing method of a motor having an armature arranged concentrically with a central axis of the motor, the method comprising the steps of:
    a) arranging an insulating spacer at a first axial end of an armature core of the armature, wherein the armature includes the armature core including a plurality of teeth each extending substantially perpendicularly to the central axis and spaced evenly apart from one another in a circumferential direction, a core back having a substantially annular shape connecting the teeth, and a plurality of slots each defined by an inner peripheral surface of the core back and a pair of opposing surfaces of adjacent teeth; a plurality of substantially U-shaped conductors including a pair of linear portions substantially parallel with one another and inserted into a corresponding ones of the plurality of slots; and a connecting portion covering an end surface of the armature core and connecting corresponding linear portions; wherein the insulating spacer is arranged at the first axial end of the armature core and includes a conductor supporting portion arranged to support the connecting portion;
    b) inserting the plurality of substantially U-shaped conductors into corresponding ones of the plurality of slots;
    c) arranging the connecting portions of the plurality of substantially U-shaped conductors at the conductor supporting portion of the insulating spacer;
    d) mounting a second insulating spacer axially above the insulating spacer; and
    e) placing the plurality of substantially U-shaped conductors at the second insulating spacer mounted above the insulating spacer; wherein
    the plurality of substantially U-shaped conductors are inserted into corresponding ones of the plurality of slots; and
    steps d) and e) are carried out after step c).

4. The manufacturing method of the motor according to claim 3, further comprising the step of:
    f) inserting a slot insulator into the slot; wherein
    the armature further includes the slot insulator arranged to cover an inner surface of the slot; and
    step f) is carried out prior to step b).

* * * * *